(12) United States Patent
Sun et al.

(10) Patent No.: US 10,841,950 B2
(45) Date of Patent: Nov. 17, 2020

(54) LISTEN BEFORE TALK TECHNIQUES IN SHARED MILLIMETER WAVE RADIO FREQUENCY SPECTRUM

(71) Applicant: QUALCOMM Incorporated, San Diego, CA (US)

(72) Inventors: Jing Sun, San Diego, CA (US); Xiaoxia Zhang, San Diego, CA (US); Arumugam Chendamarai Kannan, San Diego, CA (US); Tamer Kadous, San Diego, CA (US); Yongbin Wei, La Jolla, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/372,365

(22) Filed: Apr. 1, 2019

(65) Prior Publication Data

US 2019/0357252 A1     Nov. 21, 2019

Related U.S. Application Data

(60) Provisional application No. 62/674,578, filed on May 21, 2018.

(51) Int. Cl.
*H04W 74/08* (2009.01)
*H04W 72/12* (2009.01)
*H04W 72/14* (2009.01)

(52) U.S. Cl.
CPC ... *H04W 74/0808* (2013.01); *H04W 72/1289* (2013.01); *H04W 72/14* (2013.01)

(58) Field of Classification Search
CPC ......... H04W 74/0808; H04W 72/1289; H04W 72/14
See application file for complete search history.

(56) References Cited

U.S. PATENT DOCUMENTS

| | | | |
|---|---|---|---|
| 2016/0143014 A1* | 5/2016 | Mukherjee | ............ H04L 5/0039 370/330 |
| 2017/0202022 A1 | 7/2017 | Chendamarai et al. | |

(Continued)

FOREIGN PATENT DOCUMENTS

WO    WO-2017171613 A1    10/2017

OTHER PUBLICATIONS

"Uplink Transmission with LBT," 3GPP Draft, R2-151102_LA_UP_LBT_V2, Apr. 15, 2015 (Year: 2015).*

(Continued)

*Primary Examiner* — Jamal Javaid
(74) *Attorney, Agent, or Firm* — Holland & Hart LLP

(57) ABSTRACT

Methods, systems, and devices for wireless communications are described in which base stations and user equipment (UEs) may transmit using identified wireless resources in millimeter wave (mmW) radio frequency spectrum. A UE may receive an uplink grant from a base station that indicates uplink resources for transmission of uplink data from the UE to the base station in a shared mmW radio frequency spectrum band. An indication of a duration of a listen-before-talk (LBT) procedure may be provided in or with the uplink grant. The UE may perform, responsive to receiving the uplink grant, the LBT procedure to determine that the shared mmW radio frequency spectrum band is available for the uplink transmission. Based on the outcome of the LBT procedure, the UE may transmit the uplink data to the base station using the uplink resources indicated in the uplink grant.

58 Claims, 24 Drawing Sheets

(56) References Cited

U.S. PATENT DOCUMENTS

2017/0230986 A1* 8/2017 Moon .................. H04L 5/0078
2017/0273109 A1* 9/2017 Babaei ................. H04W 72/14
2018/0242359 A1* 8/2018 Takano ............. H04W 74/0808

OTHER PUBLICATIONS

Intel Corporation: "Uplink Transmission with LBT", 3GPP Draft, R2-151102_LAA_UP_LBT_V2, 3rd Generation Partnership Project (3GPP), Mobile Competence Centre, 650, Route Des Lucioles, F-06921 Sophia-Antipolis Cedex France, vol. RAN WG2, No. Bratislava, Slovakia, Apr. 20, 2015-Apr. 24, 2015, Apr. 19, 2015 (Apr. 19, 2015), XP050936083, pp. 1-6. Retrieved from the Internet: URL:http://www.3gpp.org/ftp/Meetings_3GPP_SYNC/RAN2/Docs/ [retrieved on Apr. 19, 2015] Sections 2 and 3.
International Search Report and Written Opinion—PCT/US2019/025403—ISA/EPO—dated Jun. 3, 2019.
QUALCOMM Incorporated: "Channel Access Procedures for NR Unlicensed", 3GPP Draft; R1-1807389, 7.6.4.1 Channel Access Procedures for NR Unlicensed, 3rd Generation Partnership Project (3GPP), Mobile Competence Centre; 650, Route Des Lucioles; F-06921 Sophia-Antipolis CED, vol. RAN WG1, No. Busan, Korea; May 21, 2018-May 25, 2018, May 12, 2018 (May 12, 2018), pp. 1-9, XP051463080, Retrieved from the Internet: URL: http://www.3gpp.org/ftp/tsg%5Fran/WG1%5FRL1/TSGR1%5F93/Docs and http://www.3gpp.org/ftp/tsg%5Fran/WG1%5FRL1/TSGR1%5F93/Docs[retrieved on May 12, 2018], Chapter 2. "Discussions", Chapter 3."Baseline LBT for sub-7GHz", Chapter 4.1."Channel Usage Indicator, Chapter 5. "LBT for mmWave NR-U;table 1.

* cited by examiner

LISTEN BEFORE TALK TECHNIQUES IN SHARED MILLIMETER WAVE RADIO FREQUENCY SPECTRUM

CROSS REFERENCES

The present application for Patent claims the benefit of U.S. Provisional Patent Application No. 62/674,578 by Sun, et al., entitled "LISTEN BEFORE TALK TECHNIQUES IN SHARED MILLIMETER WAVE RADIO FREQUENCY SPECTRUM," filed May 21, 2018, assigned to the assignee hereof, and expressly incorporated by reference herein.

BACKGROUND

The following relates generally to wireless communications, and more specifically to listen before talk techniques in shared millimeter wave radio frequency spectrum.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a base station and UE may utilize beamformed transmissions for communications to mitigate path losses (e.g., if the communications use higher frequencies, such as millimeter wave (mmW) frequencies). For example, a UE that includes multiple antennas may receive transmissions from a base station using various antenna configurations that determine a transmission beam. In shared or unlicensed radio frequency spectrum, some regulated domains require transmitters, such as UEs or base stations, to perform channel sensing before accessing the channel in accordance with a listen-before-talk (LBT) procedure. In some cases, such an LBT procedure may be a clear channel assessment (CCA) check using energy detection (ED) for a duration of a CCA observation time. If ED during a CCA is below a threshold value, the channel is available and transmissions may start. Thus, in such cases, a transmitter and receiver may not have knowledge in advance of whether a channel will be available for transmission. Techniques that may enable reliable determination of transmissions in shared radio frequency spectrum may thus enhance network efficiency.

SUMMARY

The described techniques relate to improved methods, systems, devices, and apparatuses that support listen before talk techniques in shared millimeter wave (mmW) radio frequency spectrum. Generally, the described techniques provide for base stations and user equipment (UEs) to transmit using identified wireless resources in mmW radio frequency spectrum. In some cases, a UE may receive an uplink grant from a base station that indicates uplink resources for transmission of uplink data from the UE to the base station in a shared mmW radio frequency spectrum band. In some cases, an indication of a duration of a listen-before-talk (LBT) procedure may be provided in or with the uplink grant. The UE may perform, responsive to receiving the uplink grant, the LBT procedure to determine that the shared mmW radio frequency spectrum band is available for the uplink transmission. Based on the outcome of the LBT procedure, the UE may transmit the uplink data to the base station using the uplink resources indicated in the uplink grant.

A method of wireless communication at a UE is described. The method may include receiving an uplink grant from a base station that indicates uplink resources for transmission of uplink data from the UE to the base station in a shared mmW radio frequency spectrum band, performing, responsive to receiving the uplink grant, an LBT procedure to determine that the shared mmW radio frequency spectrum band is available for the uplink transmission, and transmitting, based on the shared mmW radio frequency spectrum band being available for the uplink transmission, the uplink data to the base station using the uplink resources indicated in the uplink grant.

An apparatus for wireless communication at a UE is described. The apparatus may include a processor, memory in electronic communication with the processor, and instructions stored in the memory. The instructions may be executable by the processor to cause the apparatus to receive an uplink grant from a base station that indicates uplink resources for transmission of uplink data from the UE to the base station in a shared mmW radio frequency spectrum band, perform, responsive to receiving the uplink grant, an LBT procedure to determine that the shared mmW radio frequency spectrum band is available for the uplink transmission, and transmit, based on the shared mmW radio frequency spectrum band being available for the uplink transmission, the uplink data to the base station using the uplink resources indicated in the uplink grant.

Another apparatus for wireless communication at a UE is described. The apparatus may include means for receiving an uplink grant from a base station that indicates uplink resources for transmission of uplink data from the UE to the base station in a shared mmW radio frequency spectrum band, performing, responsive to receiving the uplink grant, an LBT procedure to determine that the shared mmW radio frequency spectrum band is available for the uplink transmission, and transmitting, based on the shared mmW radio frequency spectrum band being available for the uplink transmission, the uplink data to the base station using the uplink resources indicated in the uplink grant.

A non-transitory computer-readable medium storing code for wireless communication at a UE is described. The code may include instructions executable by a processor to receive an uplink grant from a base station that indicates uplink resources for transmission of uplink data from the UE to the base station in a shared mmW radio frequency spectrum band, perform, responsive to receiving the uplink grant, an LBT procedure to determine that the shared mmW radio frequency spectrum band is available for the uplink transmission, and transmit, based on the shared mmW radio frequency spectrum band being available for the uplink transmission, the uplink data to the base station using the uplink resources indicated in the uplink grant.

Some examples of the method, apparatuses, and non-transitory computer-readable medium described herein may further include operations, features, means, or instructions for receiving, from the base station, an indication of a duration of the LBT procedure. In some examples of the method, apparatuses, and non-transitory computer-readable medium described herein, the LBT procedure may be a clear channel assessment (CCA) check using energy detection (ED) for a duration of a CCA observation time, where the CCA observation time may be based in part on a random number that may be selected for a number of CCA slots to measure channel energy, and where the receiving the indication of the duration of the LBT procedure includes receiving the random number from the base station.

In some examples of the method, apparatuses, and non-transitory computer-readable medium described herein, the indication of the duration of the LBT procedure may be included in the uplink grant or transmitted together with the uplink grant. In some examples of the method, apparatuses, and non-transitory computer-readable medium described herein, the duration of the LBT procedure may be synchronized with a frame boundary, a slot boundary, or a symbol boundary of a frame structure used for communications between the UE and the base station. In some examples of the method, apparatuses, and non-transitory computer-readable medium described herein, the indication of the duration of the LBT procedure further indicates an offset value, and where the LBT procedure may be initiated after a time period associated with the offset value.

In some examples of the method, apparatuses, and non-transitory computer-readable medium described herein, the uplink grant may be a short control signaling transmission that may be exempt from the LBT procedure. Some examples of the method, apparatuses, and non-transitory computer-readable medium described herein may further include operations, features, means, or instructions for abandoning the transmitting of the uplink data based on the shared mmW radio frequency spectrum band being unavailable for the uplink transmission.

In some examples of the method, apparatuses, and non-transitory computer-readable medium described herein, the uplink grant may be received from the base station during a downlink transmission from the base station in a previous channel occupancy time (COT) or transmission opportunity (TxOP). In some examples of the method, apparatuses, and non-transitory computer-readable medium described herein, the uplink grant further indicates an ending time of the previous COT or TxOP, and where the UE initiates the LBT procedure after the ending time of the previous COT or TxOP. In some examples of the method, apparatuses, and non-transitory computer-readable medium described herein, at least a portion of a duration of the LBT procedure overlaps with a portion of the previous COT or TxOP. In some examples of the method, apparatuses, and non-transitory computer-readable medium described herein, the previous COT or TxOP includes a transmission for a different UE. In some examples of the method, apparatuses, and non-transitory computer-readable medium described herein, at least a portion of a duration of the LBT procedure overlaps with a portion of the previous COT or TxOP. In some examples of the method, apparatuses, and non-transitory computer-readable medium described herein, one or more of the uplink grant or uplink transmission may be transmitted via a beamformed transmission beam.

A method of wireless communication at a base station is described. The method may include allocating uplink resources to a UE for an uplink transmission of uplink data from the UE to the base station in a shared mmW radio frequency spectrum band, transmitting an uplink grant to the UE indicating the uplink resources, and monitoring for the uplink transmission from the UE using the uplink resources indicated in the uplink grant, where the UE is to perform an LBT procedure prior to the uplink transmission.

An apparatus for wireless communication at a base station is described. The apparatus may include a processor, memory in electronic communication with the processor, and instructions stored in the memory. The instructions may be executable by the processor to cause the apparatus to allocate uplink resources to a UE for an uplink transmission of uplink data from the UE to the base station in a shared mmW radio frequency spectrum band, transmit an uplink grant to the UE indicating the uplink resources, and monitor for the uplink transmission from the UE using the uplink resources indicated in the uplink grant, where the UE is to perform an LBT procedure prior to the uplink transmission.

Another apparatus for wireless communication at a base station is described. The apparatus may include means for allocating uplink resources to a UE for an uplink transmission of uplink data from the UE to the base station in a shared mmW radio frequency spectrum band, transmitting an uplink grant to the UE indicating the uplink resources, and monitoring for the uplink transmission from the UE using the uplink resources indicated in the uplink grant, where the UE is to perform an LBT procedure prior to the uplink transmission.

A non-transitory computer-readable medium storing code for wireless communication at a base station is described. The code may include instructions executable by a processor to allocate uplink resources to a UE for an uplink transmission of uplink data from the UE to the base station in a shared mmW radio frequency spectrum band, transmit an uplink grant to the UE indicating the uplink resources, and monitor for the uplink transmission from the UE using the uplink resources indicated in the uplink grant, where the UE is to perform an LBT procedure prior to the uplink transmission.

Some examples of the method, apparatuses, and non-transitory computer-readable medium described herein may further include operations, features, means, or instructions for transmitting, to the UE, an indication of a duration of the LBT procedure. In some examples of the method, apparatuses, and non-transitory computer-readable medium described herein, the LBT procedure may be a CCA check using ED for a duration of a CCA observation time, where the CCA observation time may be based in part on a random number that may be selected for a number of CCA slots to measure channel energy, and where the method further may include operations, features, means, or instructions for randomly selecting the random number for the CCA procedure and providing the random number to the UE as the indication of the duration of the LBT procedure.

In some examples of the method, apparatuses, and non-transitory computer-readable medium described herein, the indication of the duration of the LBT procedure may be included in the uplink grant or transmitted together with the uplink grant. In some examples of the method, apparatuses, and non-transitory computer-readable medium described herein, the duration of the LBT procedure may be synchronized with a frame boundary, a slot boundary, or a symbol boundary of a frame structure used for communications between the UE and the base station.

In some examples of the method, apparatuses, and non-transitory computer-readable medium described herein, the UE may be a first UE, and may further include operations, features, means, or instructions for determining that a second uplink transmission of a second UE may have a second duration that is less than the duration of the LBT procedure of the first UE, scheduling the second uplink transmission of the second UE within the duration of the LBT procedure of the first UE and transmitting a second uplink grant to the second UE. Some examples of the method, apparatuses, and non-transitory computer-readable medium described herein may further include operations, features, means, or instructions for determining an offset value between the uplink grant and a start of the LBT procedure at the first UE based on a duration of the second uplink transmission of the second UE and indicating the offset value to the first UE. In some examples of the method, apparatuses, and non-transitory computer-readable medium described herein, the second UE may be selected based on a cross-UE interference between transmission beams of the first UE and the second UE being below a threshold value.

Some examples of the method, apparatuses, and non-transitory computer-readable medium described herein may further include operations, features, means, or instructions for transmitting a second uplink grant to a different UE during a duration of the LBT procedure. In some examples of the method, apparatuses, and non-transitory computer-readable medium described herein, the uplink grant may be a short control signaling transmission that may be exempt from the LBT procedure. In some examples of the method, apparatuses, and non-transitory computer-readable medium described herein, the monitoring may include operations, features, means, or instructions for determining that the uplink transmission is not received and reusing the granted resource for transmission or reception for one or more different UEs.

In some examples of the method, apparatuses, and non-transitory computer-readable medium described herein, the uplink grant may be transmitted to the UE during a downlink transmission of a previous COT or TxOP. In some examples of the method, apparatuses, and non-transitory computer-readable medium described herein, the uplink grant further indicates an ending time of the previous COT or TxOP, and where the UE initiates the LBT procedure after the ending time of the previous COT or TxOP. In some examples of the method, apparatuses, and non-transitory computer-readable medium described herein, the uplink grant may be transmitted from the base station before an end of the downlink transmission of downlink shared channel data. In some examples of the method, apparatuses, and non-transitory computer-readable medium described herein, at least a portion of a duration of the LBT procedure overlaps with a portion of the previous COT or TxOP. In some examples of the method, apparatuses, and non-transitory computer-readable medium described herein, one or more of the uplink grant or uplink transmission may be transmitted via a beamformed transmission beam.

DETAILED DESCRIPTION

Figure 1:
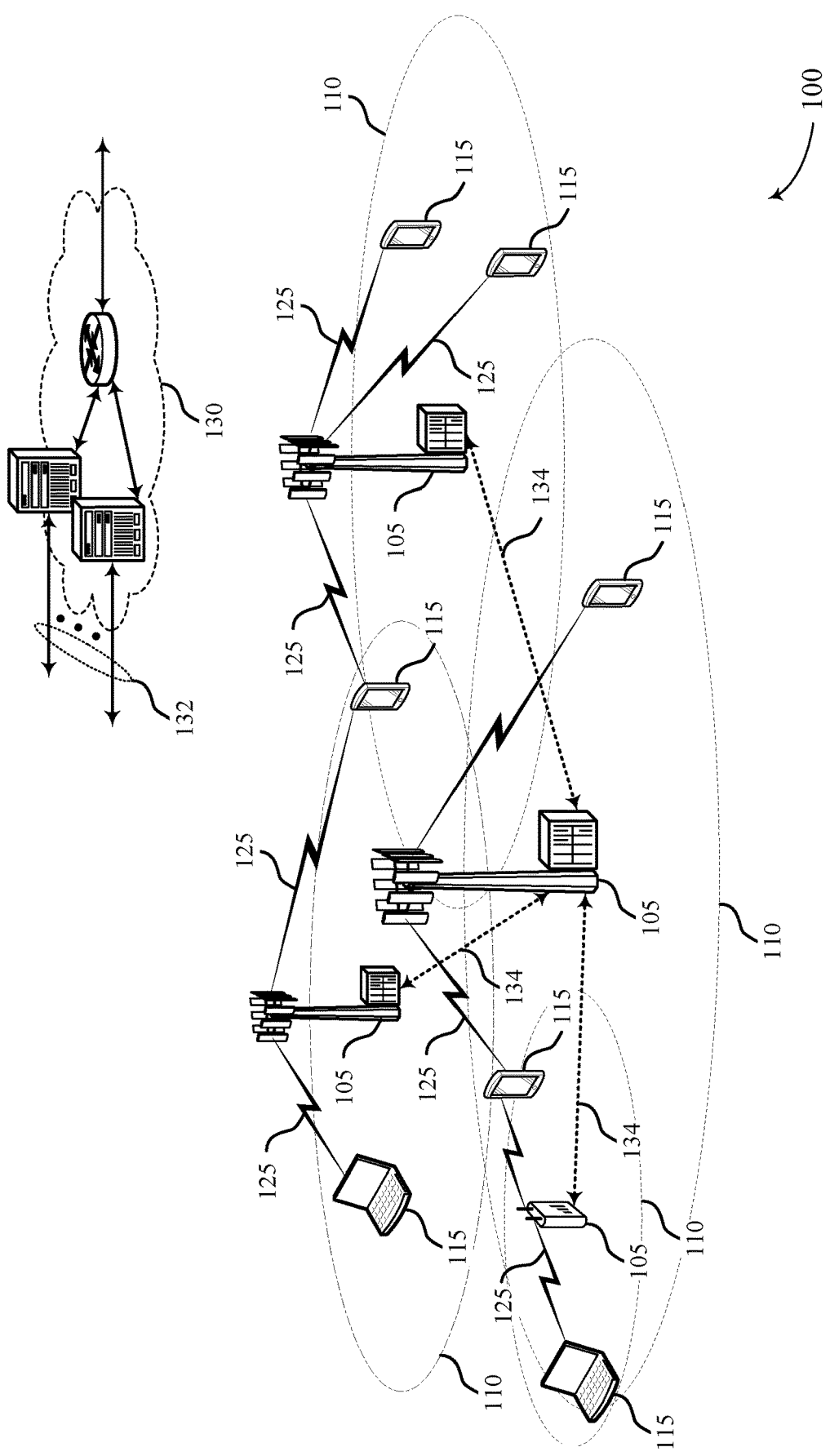
FIG. 1 illustrates an example of a system for wireless communications that supports listen before talk techniques in shared millimeter wave radio frequency spectrum in accordance with aspects of the present disclosure.

Various aspects of the present disclosure provide techniques for base stations or user equipments (UEs) to transmit using identified wireless resources in shared millimeter wave (mmW) radio frequency spectrum. In some cases, a UE may receive an uplink grant from a base station that indicates uplink resources for transmission of uplink data from the UE to the base station in a shared mmW radio frequency spectrum band. In some cases, an indication of a duration of an listen-before-talk (LBT) procedure may be provided in or with the uplink grant. The UE may perform, responsive to receiving the uplink grant, the LBT procedure to determine that the shared mmW radio frequency spectrum band is available for the uplink transmission. Based on the outcome of the LBT procedure, the UE may transmit the uplink data to the base station using the uplink resources indicated in the uplink grant.

In cases where shared mmW radio frequency spectrum bands (e.g., 60 GHz frequencies) are used for communications between a UE and a base station, an LBT procedure may be performed before a transmitter begins transmitting. As indicated above, in some cases such an LBT procedure may be a clear channel assessment (CCA) check using energy detection (ED) for a duration of a CCA observation time. If ED during a CCA is below a threshold value, the channel is available and transmissions may start. For example, in the 60 GHz unlicensed band, some regulations provide rules for channel access, such as that an observation time is determined as 8+n*5 µs, where n=0 . . . 127 and is a random integer number. In such cases, 8 µs is the minimum deferral time and each 5 is may be referred to as a CCA slot. Using such techniques, a device may monitor a channel for a continuous length of 8+n*5 µs before starting to use the channel. In the event that there is an interruption when the device is counting down, the CCA will restart with a new random number n. In some cases, a device may transmit a response to a received transmission by transmitting immediately after the packet is received without performing a CCA, and such an immediate transmission may start, for example, within 8 µs. Further, regulations may provide that certain transmissions may be CCA-exempt transmissions, such as short control signaling transmissions (e.g., acknowledgment (ACK)/negative acknowledgement (NACK) feedback signals, beacon frames, other time synchronization frames and frames for beamforming).

In cases where Long Term Evolution (LTE) or New Radio (NR) frame structures are used in such shared mmW radio frequency spectrum bands, it may be desirable for transmissions to be synchronized within a particular frame structure. In such cases, LBT procedures and associated observation times based on random numbers may result in transmission times that may be unsynchronized with the frame structure. Various techniques discussed herein provide for communications that comply with regulations related to shared mmW radio spectrum access as well as that can use LTE or NR communications schemes and frame structures.

Aspects of the disclosure are initially described in the context of a wireless communications system. Various examples of uplink and downlink transmissions are then discussed. Aspects of the disclosure are further illustrated by and described with reference to apparatus diagrams, system diagrams, and flowcharts that relate to listen before talk techniques in shared millimeter wave radio frequency spectrum.

FIG. 1 illustrates an example of a wireless communications system 100 that supports listen before talk techniques in shared millimeter wave radio frequency spectrum in accordance with aspects of the present disclosure. The wireless communications system 100 includes base stations 105, UEs 115, and a core network 130. In some examples, the wireless communications system 100 may be an LTE network, an LTE-Advanced (LTE-A) network, an LTE-A Pro network, or an NR network. In some cases, wireless communications system 100 may support enhanced broadband communications, ultra-reliable (e.g., mission critical) communications, low latency communications, or communications with low-cost and low-complexity devices. In some cases, UEs 115 and base stations 105 may transmit using shared mmW radio frequency spectrum in accordance with various techniques as discussed herein.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ LBT procedures to ensure a frequency channel is clear before transmitting data. In some cases, operations in unlicensed bands may be based on a carrier aggregation (CA) configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency division multiplexing (OFDM) or discrete Fourier transform-spread-OFDM (DFT-S-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., a set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a carrier aggregation configuration. Carrier aggregation may be used with both FDD and TDD component carriers.

In some cases, a UE 115 may receive an uplink grant from a base station 150 that indicates uplink resources for transmission of uplink data from the UE 115 to the base station 150 in a shared mmW radio frequency spectrum band. In some cases, an indication of a duration of an LBT procedure may be provided in or with the uplink grant. The UE 115 may perform, responsive to receiving the uplink grant, the LBT procedure to determine that the shared mmW radio frequency spectrum band is available for the uplink transmission. Based on the outcome of the LBT procedure, the UE 115 may transmit the uplink data to the base station 105 using the uplink resources indicated in the uplink grant.

Figure 2:
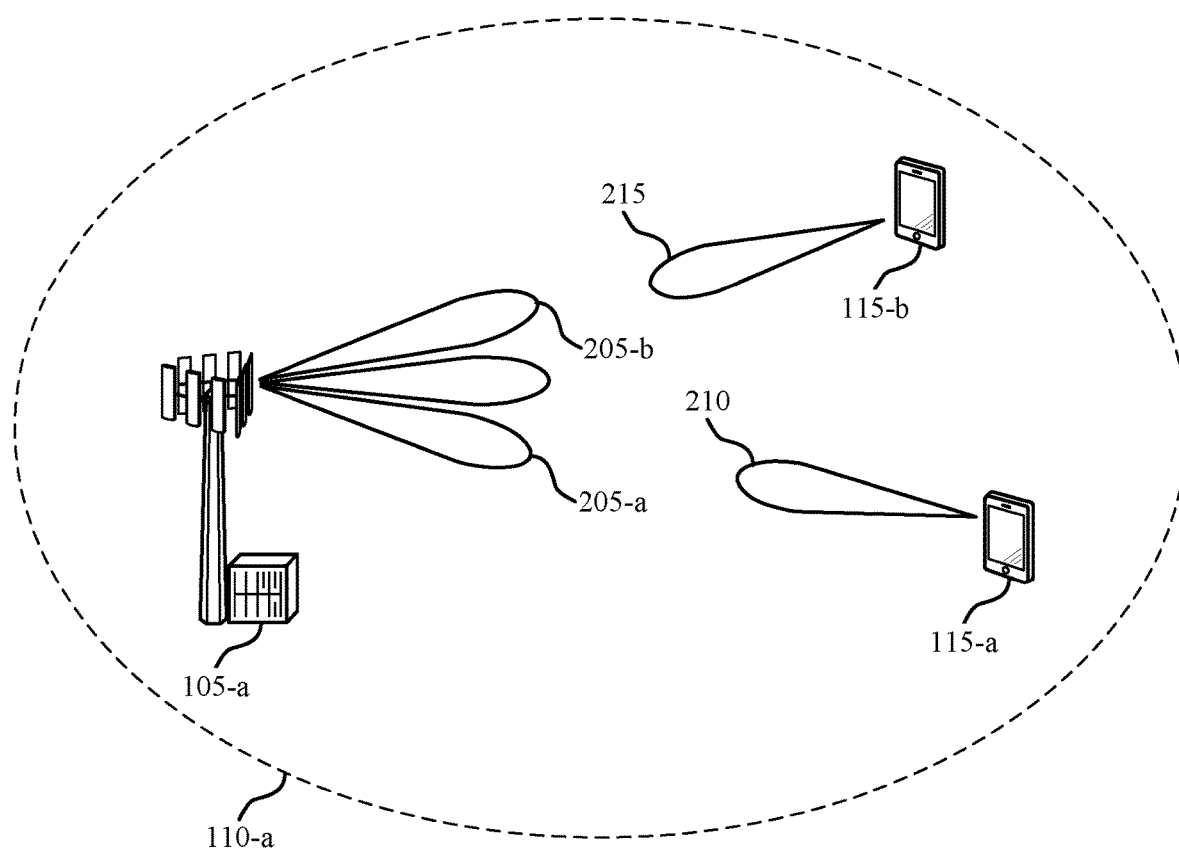
FIG. 2 illustrates an example of a portion of a wireless communications system that supports listen before talk techniques in shared millimeter wave radio frequency spectrum in accordance with aspects of the present disclosure.

FIG. 2 illustrates an example of a wireless communications system 200 that supports listen before talk techniques in shared millimeter wave radio frequency spectrum in accordance with aspects of the present disclosure. In some examples, wireless communications system 200 may implement aspects of wireless communications system 100. The wireless communications system 200 may include base station 105-*a*, a first UE 115-*a*, and a second UE 115-*b*, which may be examples of a base station 105 and a UE 115, as described with reference to FIG. 1.

Base station 105-*a* may provide network coverage for geographic area 110-*a*. Base station 105-*a* and first UE 115-*a* may communicate using beamformed or directional transmissions such as via downlink beam 205-*a* and uplink beam 210. Base station 105-*a* and second UE 115-*b* may communicate using beamformed or directional transmissions such as via downlink beam 205-*b* and uplink beam 215. The base station 150-*a* may also use non-beamformed transmissions for communications with one or more UEs 115 which may include first UE 115-*a*, second UE 115-*b*, or other UEs. As discussed above, both the base station 105-*a* and the UEs 115 may perform LBT procedures before transmitting using shared radio frequency spectrum. Further, a scheduler at the base station 105-*a* may allocate certain resources for transmissions, and various techniques may be provided that allow the base station 105-*a* and UEs 115 to transmit in accordance with the scheduled resources.

As discussed above, in cases where shared mmW radio frequency spectrum bands (e.g., 60 GHz frequencies) are used for communications, a CCA check may be performed using ED for a duration of a CCA observation time, and if ED during a CCA is below a threshold value, the channel is available and transmissions may start. In some cases, an observation time is determined as 8+n*5 µs, where n=0 . . . 127 and is a random integer number. In such cases, 8 µs is the minimum deferral time and each 5 µs may be referred to as a CCA slot. Using such techniques, a device may monitor a channel for a continuous length of 8+n*5 µs before starting to use the channel. In the event that there is an interruption when the device is counting down, the CCA will restart with a new random number n. In some cases, a device may transmit a response to a received transmission by transmitting immediately after the packet is received without performing a CCA, and such an immediate transmission may start, for example, within 8 µs. Further, regulations may provide that certain transmissions may be CCA-exempt transmissions, such as short control signaling transmissions (e.g., ACK/NACK feedback signals, beacon frames, other time synchronization frames and frames for beamforming).

In some cases, mmW transmissions may use a sub-carrier spacing (SCS) of 960 kHz. In such cases, 8 µs will be about half of a slot according to a 960 kHz SCS and 8+127*5 will be about 41.2 slots. Thus, the CCA in such cases may range from about half of a slot to up to about 41 slots, which can provide substantial variability on when a receiving device can expect to receive a transmission. For a responding device, only if the transmission can happen within 8 µs of the ending of reception, the CCA can be skipped. Thus, if the first UE 115-*a* is receiving a downlink transmission from the base station 105-*a*, a HARQ ACK/NACK feedback transmission may be transmitted within 8 s of the ending of the downlink transmission and a scheduler at the base station may leave at most a half-slot (7 symbol) gap between the downlink and uplink data bursts. For example, this may be achieved by either a half-slot scheduled at the end of a downlink burst, or a half-slot scheduled at the beginning an uplink burst. However, a UE 115 may not have sufficient processing capability for receiving and processing a downlink transmission, and preparing and transmitting an ACK/NACK response within such a time period. Techniques for transmitting such ACK/NACK responses are provided and discussed in more detail below. Additionally, techniques for synchronizing uplink data transmissions from UEs 115 are provided and discussed in more detail below.

Figure 3A:
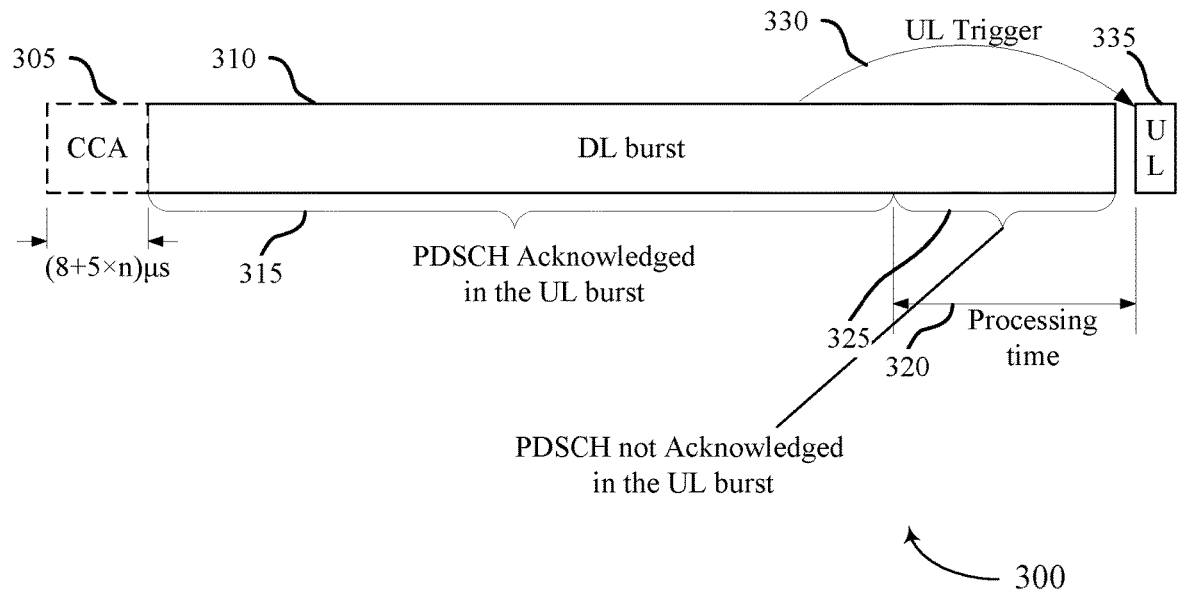
FIGS. 3A and 3B illustrate examples of uplink acknowledgment techniques that supports listen before talk techniques in shared millimeter wave radio frequency spectrum in accordance with aspects of the present disclosure.
Figure 3B:
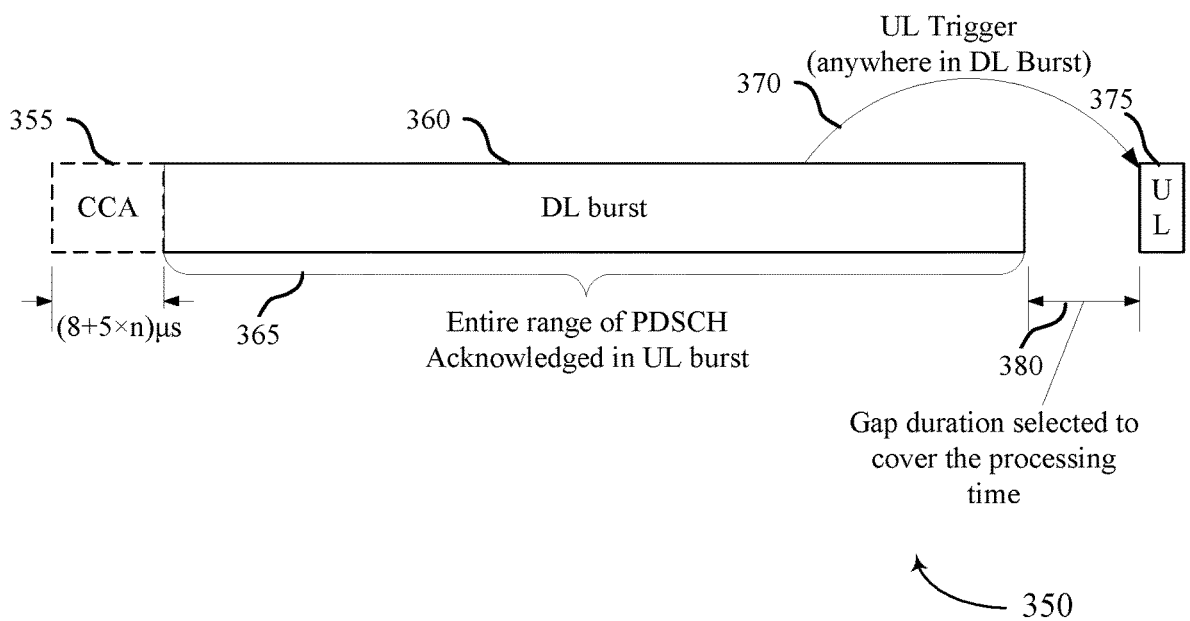

FIGS. 3A and 3B illustrate examples of a uplink acknowledgment techniques 300 and 350 that may be used in conjunction with listen before talk techniques in shared mmW radio frequency spectrum in accordance with aspects of the present disclosure. In some examples, uplink acknowledgment techniques 300 and 350 may be implemented in aspects of wireless communications system 100 or 200.

Initially, in the example of FIG. 3A, a transmission opportunity (TxOP) or channel occupancy time (COT) may be used for a downlink-centric data transmission to a UE, in which a base station may perform a CCA 305, after which a downlink burst 310 may be transmitted. The duration of the CCA 305 may be (8+5*n)µs, as discussed above. In some cases, the CCA 305 duration may adjusted to be longer than the randomly identified integer n, in order to align the downlink burst with a slot or mini-slot boundary. In some cases, packet construction for the downlink burst 310 may start early, based on the assumption the CCA will pass. In the example, of FIG. 3A, an uplink control transmission 335

(e.g., an ACK/NACK transmission) follows the downlink burst 310 within 8 µs. In some case, the base station may provide an uplink trigger 330 within the downlink burst 310 that indicates the location of the uplink control transmission 335. In some cases, a processing time 320 may be identified for the UE, during which the UE may process downlink transmissions and generate ACK/NACK feedback information. In such cases the uplink trigger 330 may be provided before the start of the processing time 320 before the uplink control transmission 335.

Additionally, in some cases the downlink burst 310 may have physical downlink shared channel (PDSCH) data, and a first portion 315 of the PDSCH data may be acknowledged in the uplink burst with the uplink control transmission 335, and a second portion 325 of the PDSCH data may not be acknowledged in the uplink burst with the uplink control transmission 335. In some cases, the second portion 325 may include padding, control information, or repetitions of earlier data such that acknowledgment is not needed.

In other cases, such as in the example of FIG. 3B, an uplink control transmission 375 may be considered to be CCA-exempt short control signaling. In such case, the base station may perform a CCA 355, after which a downlink burst 360 may be transmitted. The duration of the CCA 355 may be $(8+5*n)$µs, as discussed above, and in some cases duration may adjusted in order to align the downlink burst with a slot or mini-slot boundary. In the example, of FIG. 3A, an uplink control transmission 375 (e.g., an ACK/NACK transmission) follows the downlink burst 360 after a gap duration 380 that may correspond to the processing time of the UE. In some case, the base station may provide an uplink trigger 370 anywhere within the downlink burst 360 that indicates the location of the uplink control transmission 375. Because the uplink control transmission 375 is a CCA-exempt transmission, the downlink burst 360 can simply indicate the location of the uplink control transmission 375 location, without the constraint on the 8 µs gap. Further, this can leave enough processing gap that the PDSCH in the last part of downlink burst 360 can be acknowledged in the same control transmission 375.

Figure 4:
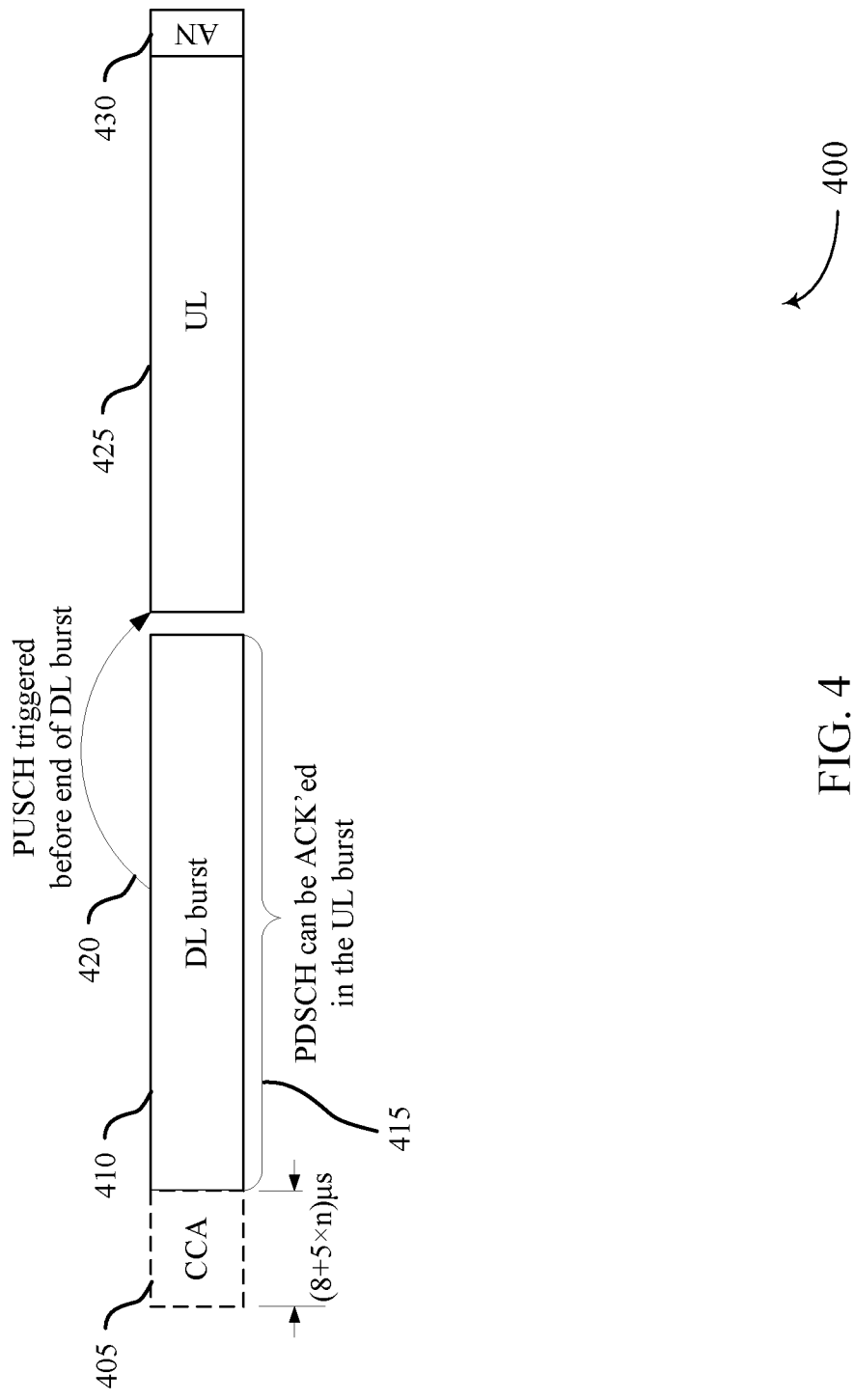
FIG. 4 illustrates an example of an uplink acknowledgment technique that supports listen before talk techniques in shared millimeter wave radio frequency spectrum in accordance with aspects of the present disclosure.

FIG. 4 illustrates an example of a uplink acknowledgment technique 400 that supports listen before talk techniques in shared millimeter wave radio frequency spectrum in accordance with aspects of the present disclosure. In some examples, uplink acknowledgment technique 400 may be implemented in aspects of wireless communications system 100 or 200. In the example of FIG. 4, a TxOP or COT may be used for both downlink data transmission in a downlink burst 410 and uplink data transmission in an uplink burst 425. In this example, the base station may perform a CCA 405, after which the downlink burst 410 may be transmitted. The duration of the CCA 305 may be $(8+5*n)$ is, as discussed above. In some cases, the CCA 305 duration may adjusted to be longer than the randomly identified integer n, in order to align the downlink burst with a slot or mini-slot boundary.

In the example, of FIG. 4, the downlink burst 410 may include PDSCH data 415, and the uplink burst 425 may include physical uplink shared channel (PUSCH) data as well as ACK/NACK feedback 430. In this example, a PUSCH trigger 420 may be provided within the downlink burst 410 that triggers the transmission of uplink burst 425 within 8 µs of the end of the downlink burst 410. In some cases, the PUSCH trigger 420 may be transmitted before the end of the downlink burst 410, such that the UE has sufficient time to prepare the PUSCH data for transmission. In this example, the ACK/NACK feedback is provided at the end of the uplink burst 425 in order to provide the UE with sufficient time to process the PDSCH data and generate the ACK/NACK feedback 430.

Figure 5:
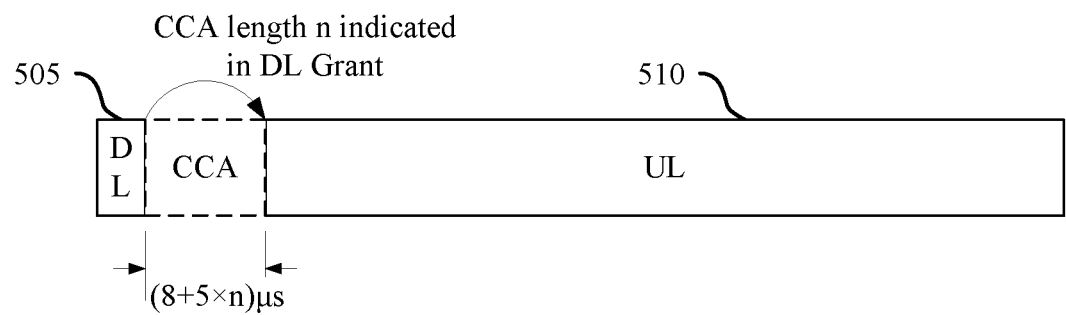
FIG. 5 illustrates an example of a downlink trigger that supports listen before talk techniques in shared millimeter wave radio frequency spectrum in accordance with aspects of the present disclosure.

FIG. 5 illustrates an example of a downlink trigger 500 that supports listen before talk techniques in shared millimeter wave radio frequency spectrum in accordance with aspects of the present disclosure. In some examples, downlink trigger 500 may be implemented in aspects of wireless communications system 100 or 200. In the example of FIG. 5, a TxOP or COT may be used for an uplink-centric data transmission. In such cases, the base station may not be able to perform a CCA to obtain the channel for the TxOP, because the UE may be unable to receive an uplink grant, process the grant, and begin transmitting an uplink transmission within an 8 µs time limit. Thus, in such cases, the UE may perform the CCA.

In some cases, the base station may transmit a downlink grant 505 that may indicate uplink resources, after which the UE may perform a CCA and transmit uplink burst 510 using the uplink resources. The duration of the CCA may be $(8+5*n)$ is, as discussed above, and thus the base station may need to monitor for the uplink burst 510 for up to the entire potential duration of the CCA which, as discussed above, may take between 0.5 and 41.2 slots. In some cases, the downlink grant 505 may be provided with an indication that the uplink burst 510 is to start at some time at or later than the maximum potential CCA duration, and the UE may determine the CCA duration and start the CCA in accordance with the indicated timing. In other cases, the base station may generate the random number for the CCA duration, and may provide the random number to the UE, such that the base station knows when the uplink burst 510 will be transmitted. In some cases, the base station may provide the value of n such that the uplink burst 510 can be aligned with slots or symbols.

Using such techniques may allow the base station to know when the uplink burst 510 will start. If the UE makes the determination of n, this information will not be known at the base station, and thus the base station would need to perform blind detection on all possible uplink data burst transmission starting locations. In some cases, if the CCA fails at the UE, the UE may abandon the uplink transmission, and wait to receive a subsequent allocation of uplink resources for transmission of the uplink data.

Figure 6:
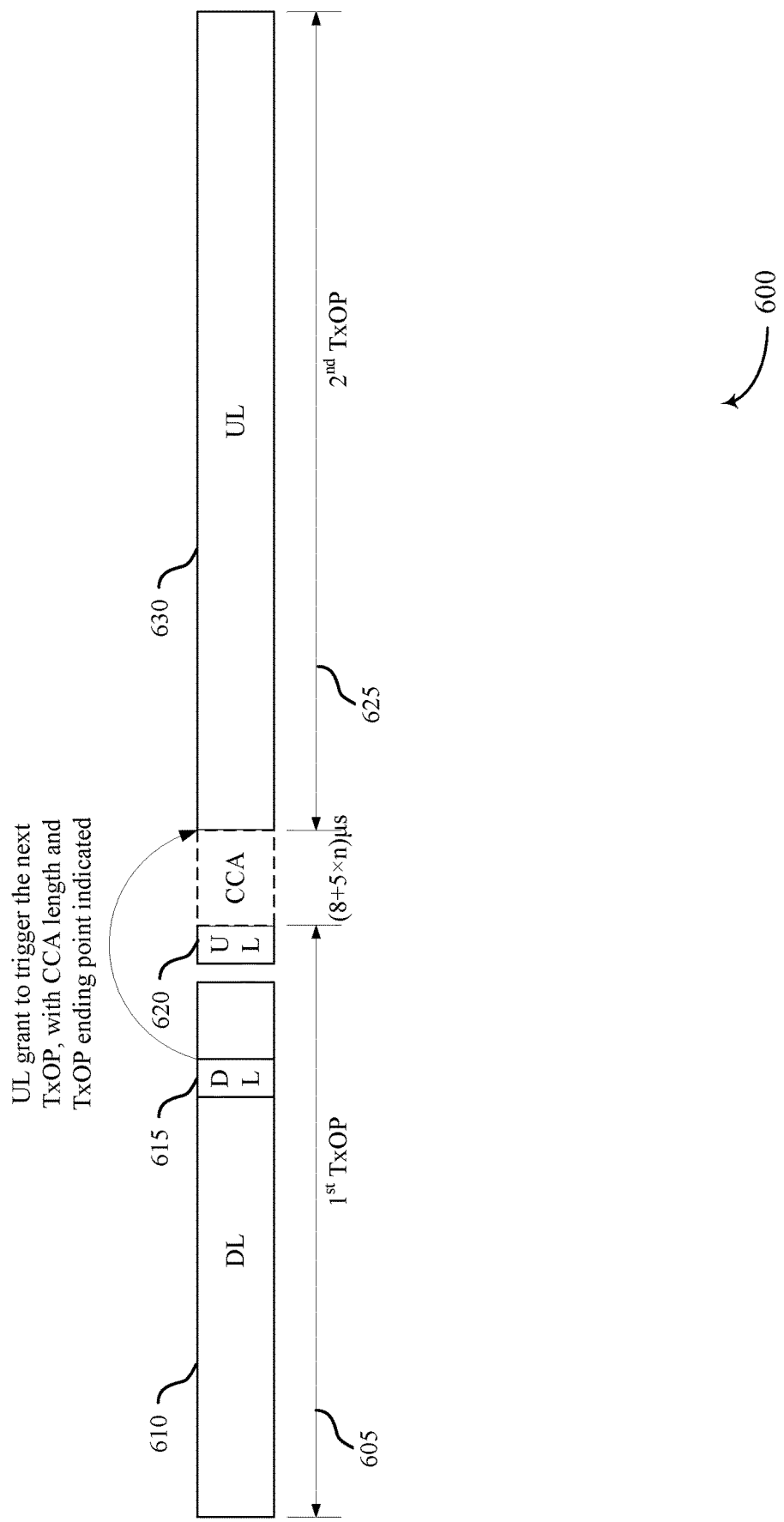
FIG. 6 illustrates an example of a downlink trigger for another transmission opportunity that supports listen before talk techniques in shared millimeter wave radio frequency spectrum in accordance with aspects of the present disclosure.

FIG. 6 illustrates an example of a downlink trigger for another TxOP 600 that supports listen before talk techniques in shared millimeter wave radio frequency spectrum in accordance with aspects of the present disclosure. In some examples, downlink trigger for another TxOP 600 may be implemented in aspects of wireless communications system 100 or 200. In the example of FIG. 6, a first TxOP 605 may be followed by a second TxOP 625. The first TxOP 605 may include a downlink-centric transmission with downlink burst 610. In this example, the downlink burst 610 may include an uplink grant 615 to trigger an uplink burst 630 in the second TxOP 625.

In some cases, similarly as discussed above with respect to FIG. 5, the uplink grant 615 may include a value of n for the UE to use for its CCA. In the example of FIG. 6, the UE may transmit an uplink acknowledgement 620 of the grant in the second TxOP 625, and then perform the CCA followed by the uplink burst 630. In some cases, the granted PUSCH resources may be provided out of a maximum COT (e.g., out of a 9 ms MCOT). In some cases, the uplink grant 615 may include the CCA trigger and a number of CCA slots for ED or the value of n. In some cases, the uplink grant 615 may also include an indication of when the first TxOP 605.

In other cases, the uplink grant 615 may merge the TxOP ending point information with n. In such cases, the UE sees a bigger n and will perform longer CCA than necessary. Further, the energy of the downlink burst 610 in the first TxOP 605 may result in energy detection at the UE, and in some cases the UE may account for the remaining portion of the downlink burst 610 in the CCA. In some cases, the uplink grant 615 may be transmitted in a different beam to a different UE than the beam used for the downlink burst 610. In some cases, the different UEs and different beams may be selected such that the UE that is to transmit uplink burst 630 is unlikely to receive interference from the beam used to transmit the downlink burst 610 (e.g., the base station may select UEs with relatively small cross-interference).

Figure 7:
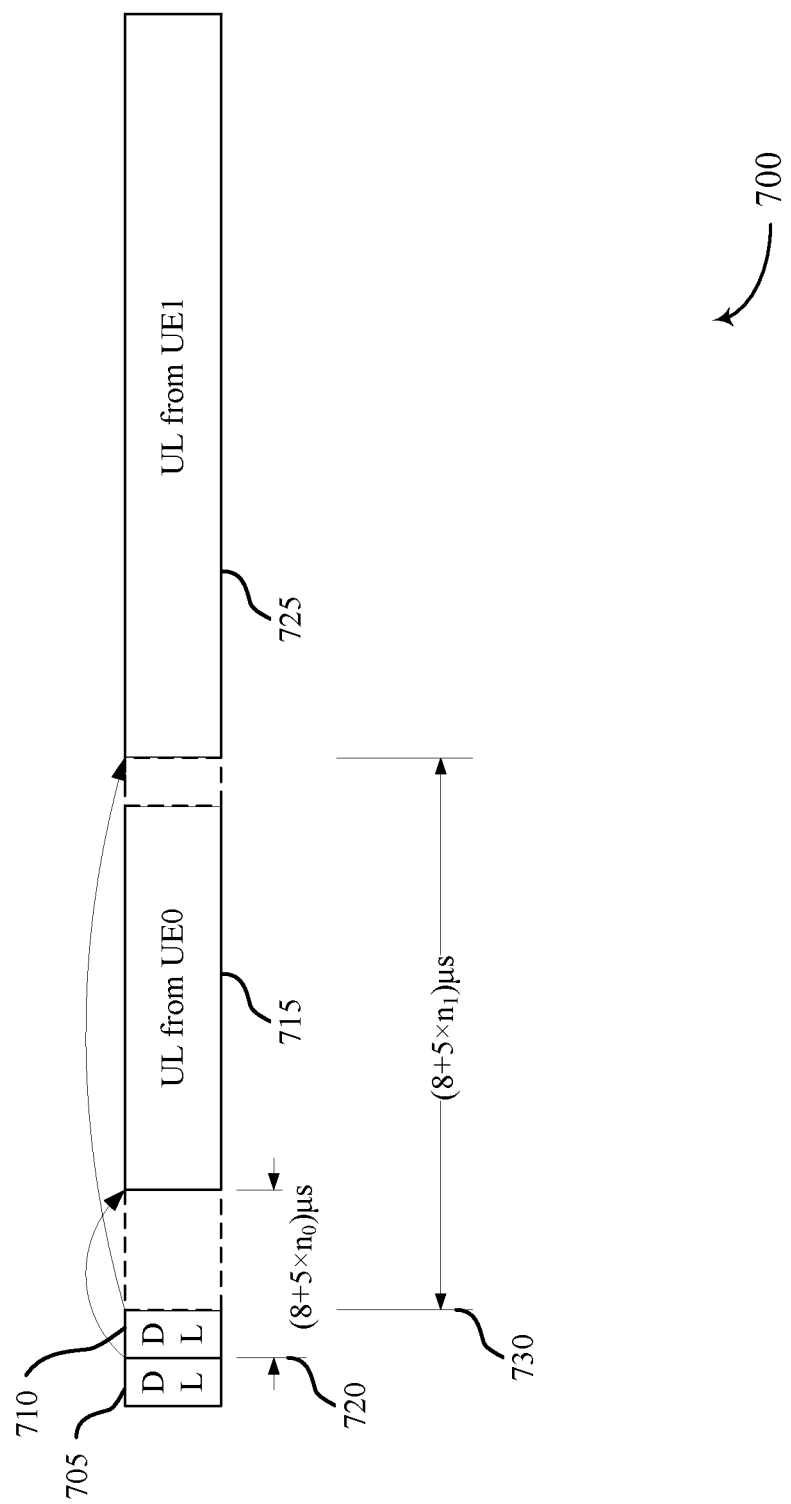
FIG. 7 illustrates an example of multiple downlink triggers that support listen before talk techniques in shared millimeter wave radio frequency spectrum in accordance with aspects of the present disclosure.

FIG. 7 illustrates an example of a multiple downlink triggers 700 that supports listen before talk techniques in shared millimeter wave radio frequency spectrum in accordance with aspects of the present disclosure. In some examples, multiple downlink triggers 700 may be implemented in aspects of wireless communications system 100 or 200. As discussed above, in some cases a base station may determine a CCA duration for a UE. Further, in some cases the CCA duration may be relatively long, depending upon the randomly selected value of n for determining the number of CCA slots. In some cases, if a CCA duration for a first UE is sufficiently long, a second UE may be scheduled within the gap created by the CCA, if the CCA duration and uplink transmission duration of the second UE can fit within the CCA duration of the first UE.

In the example of FIG. 7, a first downlink grant 705 may indicate a first value of n (no) that may be used for determining a first CCA duration 720. The associated uplink transmission 715 from the first UE may be transmitted following the first CCA duration 720. A second downlink grant 710 may indicate a second value of n ($n_1$) for a second UE that may be used for determining a second CCA duration 730 of the second UE before transmitting its associated second uplink transmission 725. Such techniques may allow a scheduler at a base station to make use of the CCA gap at different UEs. As discussed above, when the UE performs CCA, the CCA gap is from 0.5 slot to 41.2 slots, and on average will be around 20 slots. The scheduler may use the resources of such CCA gaps to help enhance network efficiency. In some cases, a scheduler at the base station may select the first UE and second UE such that the transmission beam of the first UE is unlikely to cause the CCA at the second UE to fail.

In some cases, cross UE interference information may be collected at the base station that can be used to select UEs that may be considered for such uplink grants. For example, a base station may collect the information by checking CCA failure events, and if the second UE has high CCA failures when the first UE is transmitting, the base station may determine that cross UE interference between the first UE and second UE is present, and may avoid scheduling the first UE to transmit before the second UE when the second UE is performing a CCA.

In some cases, the values of $n_0$ and $n_1$ may be generated and the base station may determine if the uplink burst length of uplink transmission 715 is less than or equal to $n_1-n_0$, or allocate resources for such a burst length, before transmitting the downlink grants 705 and 710. In such cases, there is $n_0$ limitation of the burst length of the second uplink transmission 725 beyond the maximum COT. In other cases, such as discussed with respect to FIG. 8, CCA starting offsets may be utilized when scheduling UEs.

Figure 8:
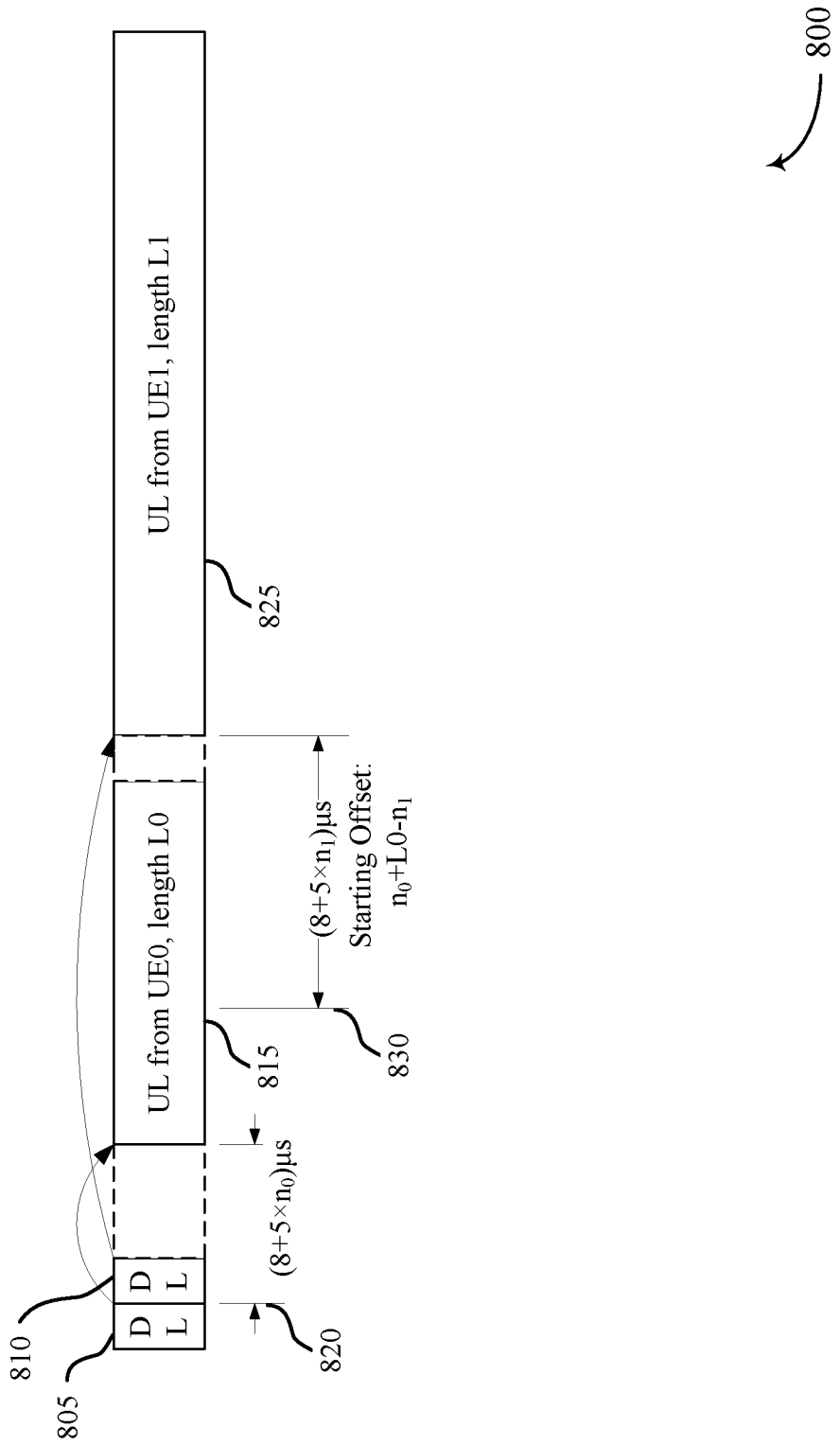
FIG. 8 illustrates an example of a downlink trigger with starting offset that supports listen before talk techniques in shared millimeter wave radio frequency spectrum in accordance with aspects of the present disclosure.

FIG. 8 illustrates an example of a downlink trigger with starting offset 800 that supports listen before talk techniques in shared millimeter wave radio frequency spectrum in accordance with aspects of the present disclosure. In some examples, downlink trigger with starting offset 800 may be implemented in aspects of wireless communications system 100 or 200. In this example, similarly as discussed with respect to FIG. 7, a first UE and a second UE may be scheduled for a first uplink transmission 815 and a second uplink transmission 825.

A first downlink grant 805 may indicate a first value of n (no) that may be used for determining a first CCA duration 820. The associated uplink transmission 815 from the first UE may be transmitted following the first CCA duration 820. A second downlink grant 810 may indicate a second value of n ($n_1$) for a second UE that may be used for determining a second CCA duration 830 of the second UE before transmitting its associated second uplink transmission 825. In this example, a starting offset may also be provided to the second UE, such that the second CCA is not started until the starting offset expires. In cases where the length of the first uplink transmission is L0, the starting offset may be set as $n_0+L0-n_1$. In such a manner, the base station may delay the start of the second UEs CCA to allow for the first UE to transmit the first uplink transmission 815.

Figure 9:
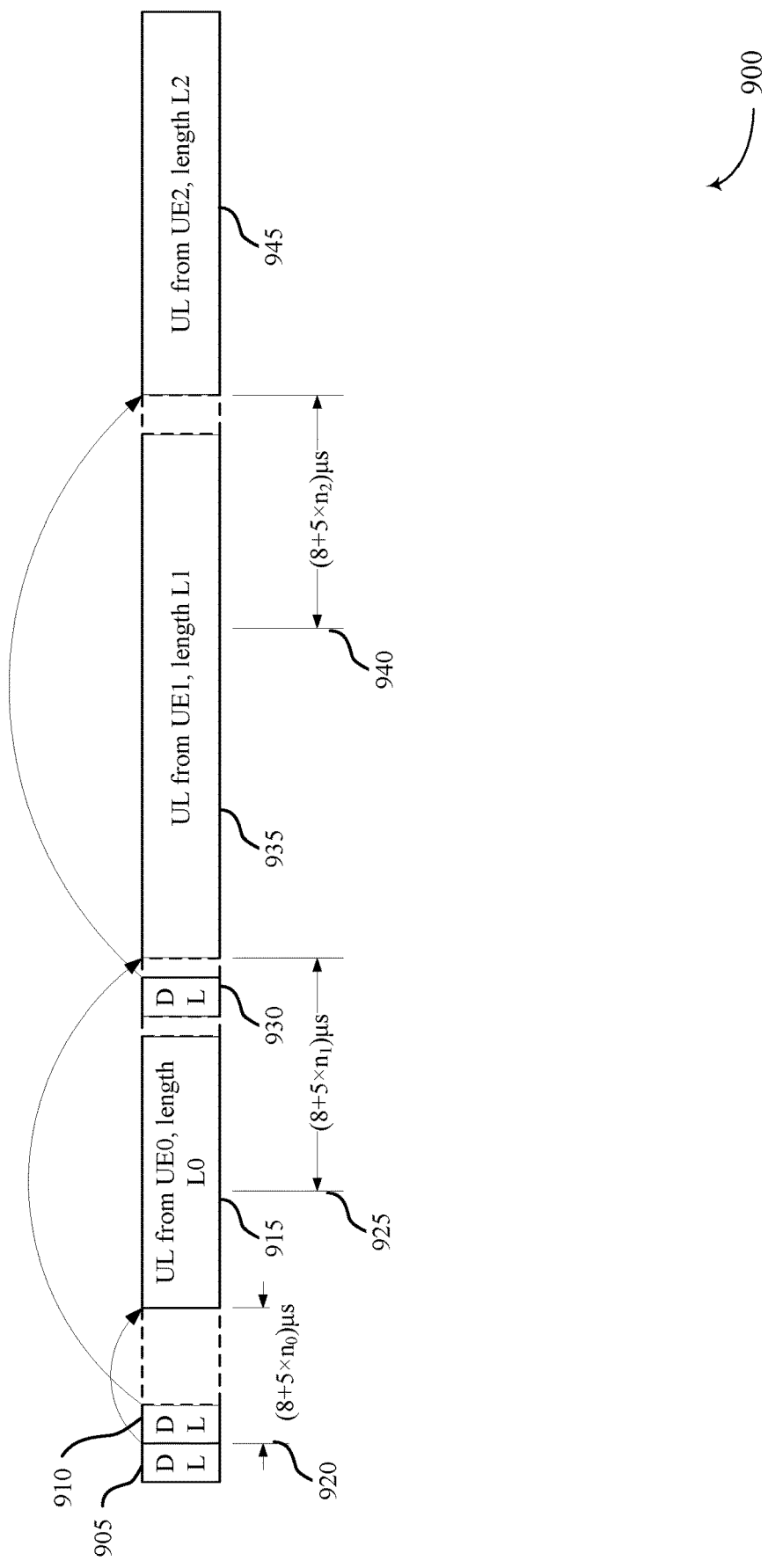
FIG. 9 illustrates an example of multiple downlink triggers with starting offsets that supports listen before talk techniques in shared millimeter wave radio frequency spectrum in accordance with aspects of the present disclosure.

FIG. 9 illustrates an example of a multiple downlink triggers with starting offsets 900 that supports listen before talk techniques in shared millimeter wave radio frequency spectrum in accordance with aspects of the present disclosure. In some examples, multiple downlink triggers with starting offsets 900 may be implemented in aspects of wireless communications system 100. This example provides additional downlink short control bursts which may be used to grant uplink bursts from multiple UEs. Using techniques as discussed above with respect to FIGS. 7 and 8, a base station may transmit a first downlink grant 905 to a first UE for a first uplink transmission 915. The first downlink grant 905 may include a value of $n_0$ that is provided to the first UE. A second downlink grant 910 may be transmitted to a second UE, which may indicate a starting offset and an indication of a second CCA duration 925 of the second UE before starting a second uplink transmission 935.

In this example, the second CCA duration 925 and starting offset may be selected to provide a gap between the first uplink transmission 915 and the second uplink transmission 935 during which a third downlink grant 930 may be transmitted. The third downlink grant 930, as well as the first downlink grant 905 and second downlink grant 910, may be short control signaling that is exempt from CCA, such that the base station may make such transmissions without performing CCA. In this example, the third downlink grant 930 may indicate a CCA duration through a value of $n_2$ for the third UE that may be used to determine a third CCA duration 940 before a third uplink transmission 945 from the third UE. A starting offset before the third CCA duration 940 may also be provided such that the third CCA duration 940 starts at some point during the second uplink transmission 935 and finished at the scheduled starting time for the third uplink transmission 945. Similarly as discussed above, the UEs for such transmissions may be selected to provide that cross UE interference is unlikely to result in a CCA failure.

Figure 10:
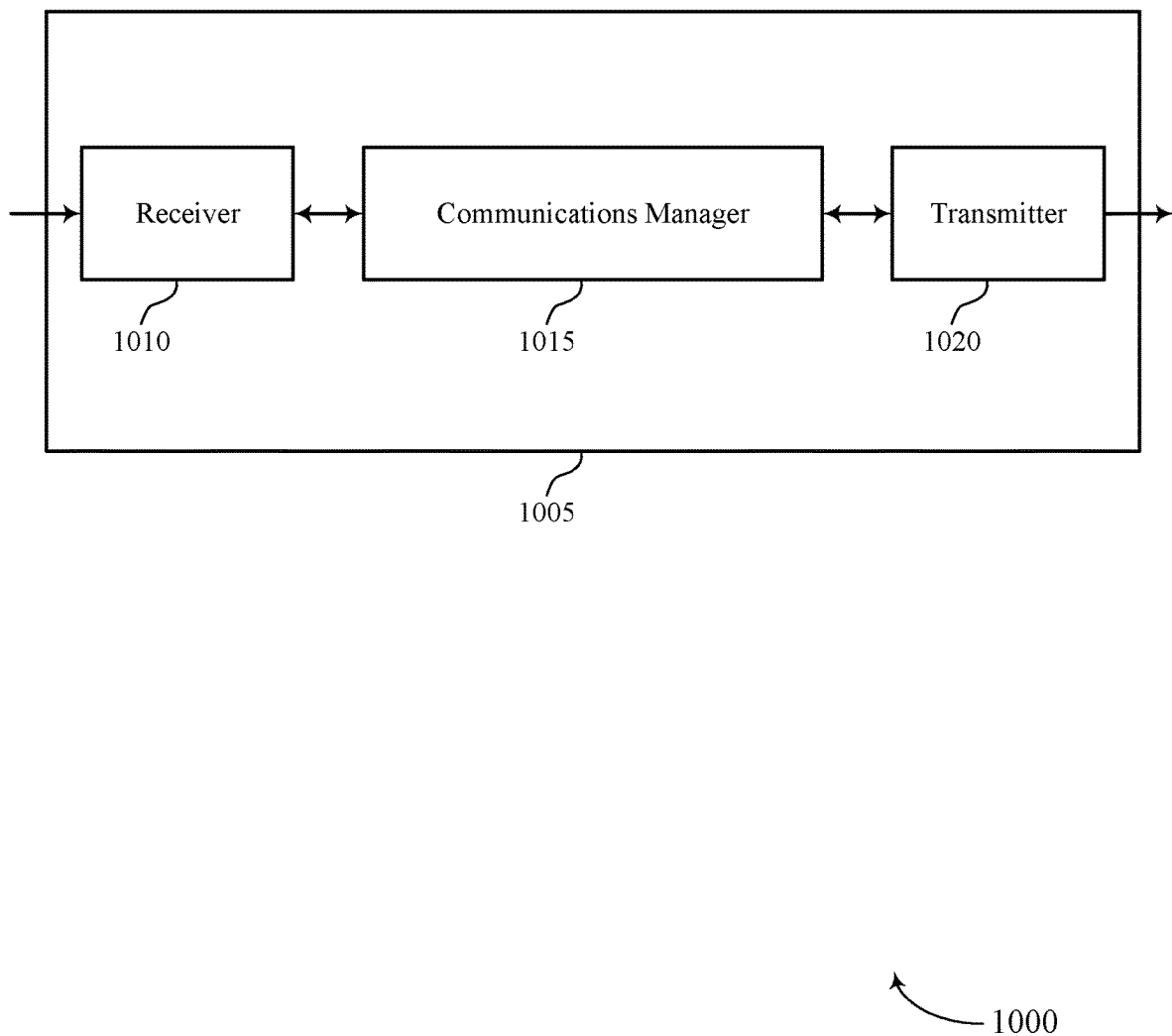
FIGS. 10 and 11 show block diagrams of devices that support listen before talk techniques in shared millimeter wave radio frequency spectrum in accordance with aspects of the present disclosure.

FIG. 10 shows a block diagram 1000 of a device 1005 that supports listen before talk techniques in shared millimeter wave radio frequency spectrum in accordance with aspects of the present disclosure. The device 1005 may be an example of aspects of a UE 115 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to listen before talk techniques in shared millimeter wave radio frequency spectrum, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive an uplink grant from a base station that indicates uplink resources for transmission of uplink data from the UE to the base station in a shared mmW radio frequency spectrum band, perform, responsive to receiving the uplink grant, an LBT procedure to determine that the shared mmW radio frequency spectrum band is available for the uplink transmission, and transmit, based on the shared mmW radio frequency spectrum band being available for the uplink transmission, the uplink data to the base station using the uplink resources indicated in the uplink grant. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
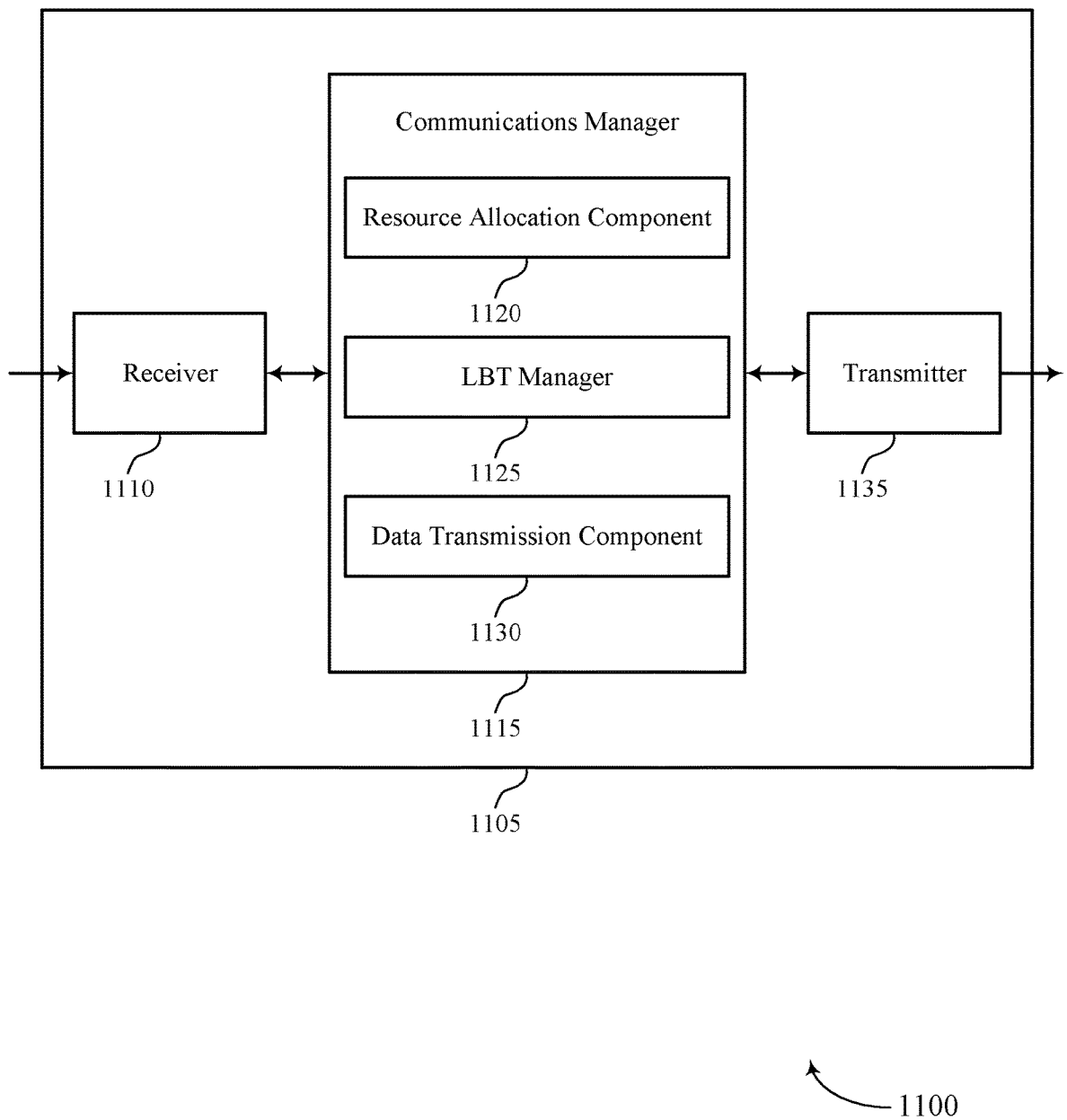

FIG. 11 shows a block diagram 1100 of a device 1105 that supports listen before talk techniques in shared millimeter wave radio frequency spectrum in accordance with aspects of the present disclosure. The device 1105 may be an example of aspects of a device 1005 or a UE 115 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to listen before talk techniques in shared millimeter wave radio frequency spectrum, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a resource allocation component 1120, an LBT manager 1125, and a data transmission component 1130. The communications manager 1115 may be an example of aspects of the communications manager 1310 described herein.

The resource allocation component 1120 may receive an uplink grant from a base station that indicates uplink resources for transmission of uplink data from the UE to the base station in a shared mmW radio frequency spectrum band.

The LBT manager 1125 may perform, responsive to receiving the uplink grant, an LBT procedure to determine that the shared mmW radio frequency spectrum band is available for the uplink transmission.

The data transmission component 1130 may transmit, based on the shared mmW radio frequency spectrum band being available for the uplink transmission, the uplink data to the base station using the uplink resources indicated in the uplink grant.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
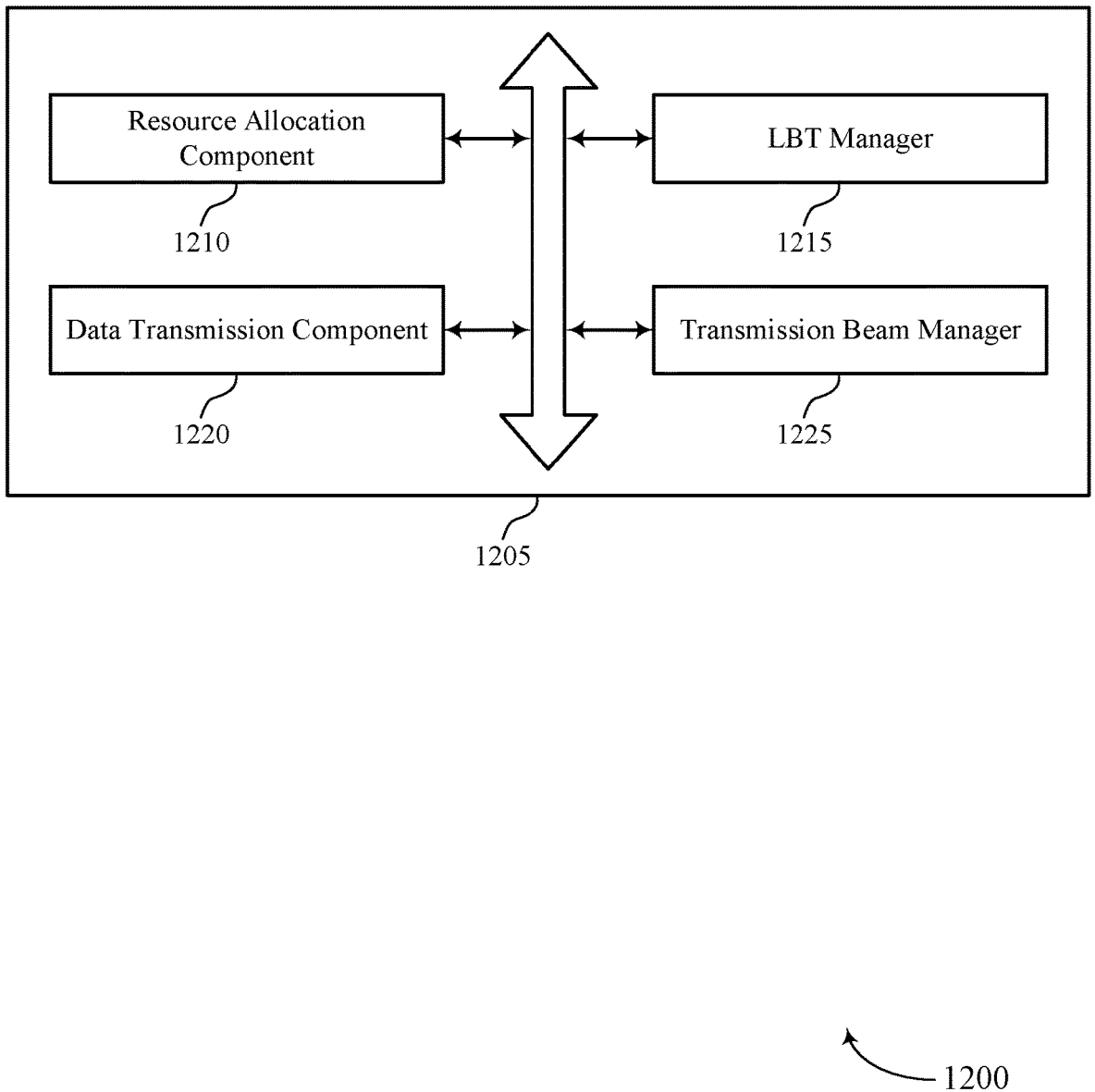
FIG. 12 shows a block diagram of a communications manager that supports listen before talk techniques in shared millimeter wave radio frequency spectrum in accordance with aspects of the present disclosure.

FIG. 12 shows a block diagram 1200 of a communications manager 1205 that supports listen before talk techniques in shared millimeter wave radio frequency spectrum in accordance with aspects of the present disclosure. The communications manager 1205 may be an example of aspects of a communications manager 1015, a communications manager 1115, or a communications manager 1310 described herein. The communications manager 1205 may include a resource allocation component 1210, an LBT manager 1215, a data transmission component 1220, and a transmission beam manager 1225. Each of these modules may communicate, directly or indirectly, with one another (e.g., via one or more buses).

The resource allocation component 1210 may receive an uplink grant from a base station that indicates uplink resources for transmission of uplink data from the UE to the base station in a shared mmW radio frequency spectrum band. In some cases, the uplink grant is received from the base station during a downlink transmission from the base station in a previous COT or TxOP.

The LBT manager 1215 may perform, responsive to receiving the uplink grant, an LBT procedure to determine that the shared mmW radio frequency spectrum band is available for the uplink transmission. In some examples, the LBT manager 1215 may receive, from the base station, an indication of a duration of the LBT procedure. In some cases, the LBT procedure is a CCA check using ED for a duration of a CCA observation time, where the CCA observation time is based in part on a random number that is selected for a number of CCA slots to measure channel energy, and where the receiving the indication of the duration of the LBT procedure includes receiving the random number from the base station. In some cases, the indication of the duration of the LBT procedure is included in the uplink grant or transmitted together with the uplink grant. In some cases, the duration of the LBT procedure is synchronized with a frame boundary, a slot boundary, or a symbol boundary of a frame structure used for communications between the UE and the base station.

In some cases, the indication of the duration of the LBT procedure further indicates an offset value, and where the LBT procedure is initiated after a time period associated with the offset value. In some cases, the uplink grant is a short control signaling transmission that is exempt from the LBT procedure. In some cases, the uplink grant further indicates an ending time of the previous COT or TxOP, and where the UE initiates the LBT procedure after the ending time of the previous COT or TxOP. In some cases, at least a portion of a duration of the LBT procedure overlaps with a portion of the previous COT or TxOP. In some cases, the previous COT or TxOP includes a transmission for a different UE.

The data transmission component 1220 may transmit, based on the shared mmW radio frequency spectrum band being available for the uplink transmission, the uplink data to the base station using the uplink resources indicated in the uplink grant. In some examples, the data transmission component 1220 may abandon the transmitting of the uplink data based on the shared mmW radio frequency spectrum band being unavailable for the uplink transmission.

The transmission beam manager 1225 may manage one or more transmission beams for a mmW channel. In some cases, one or more of the uplink grant or uplink transmission are transmitted via a beamformed transmission beam.

Figure 13:
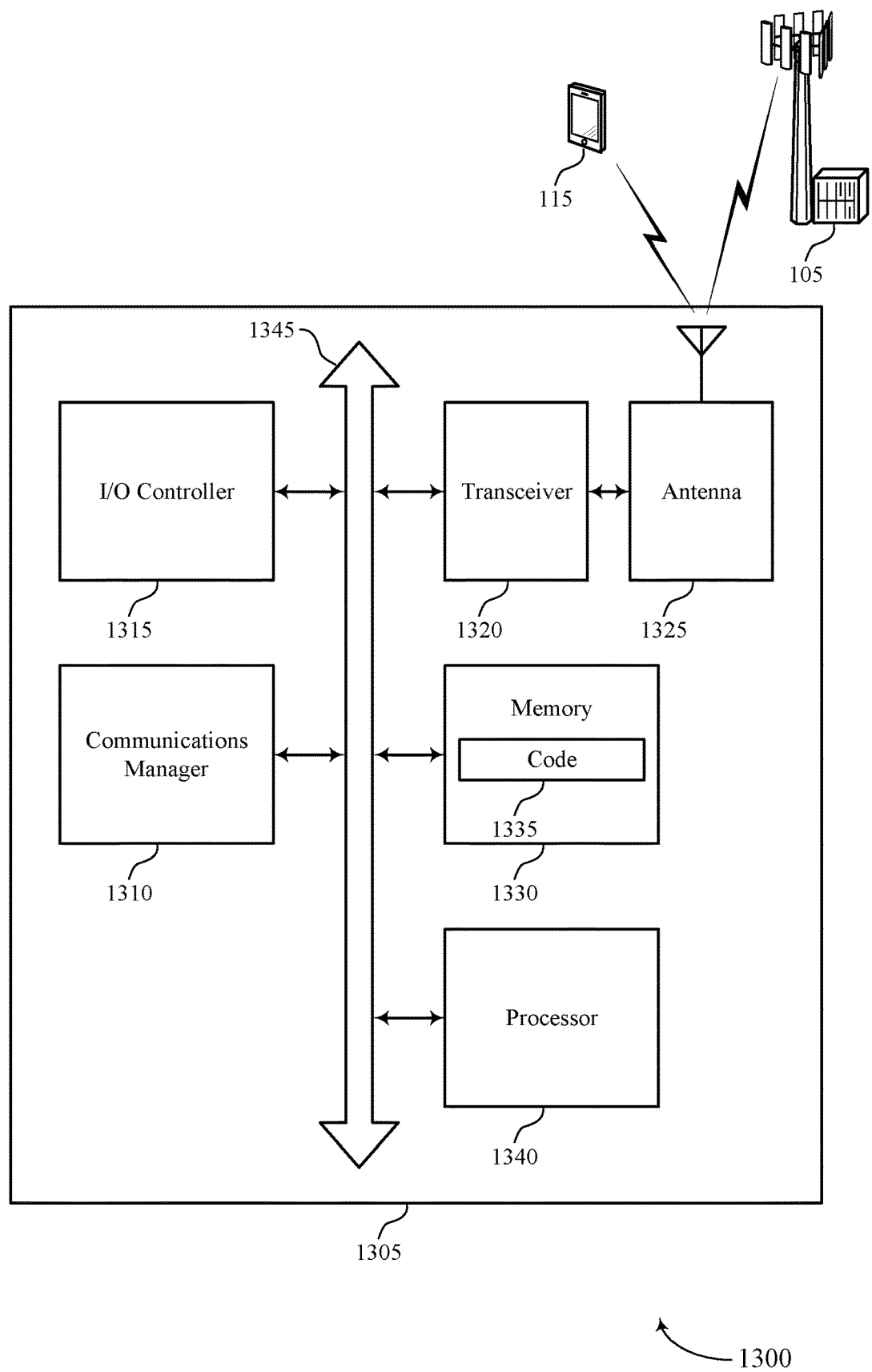
FIG. 13 shows a diagram of a system including a device that supports listen before talk techniques in shared millimeter wave radio frequency spectrum in accordance with aspects of the present disclosure.

FIG. 13 shows a diagram of a system 1300 including a device 1305 that supports listen before talk techniques in shared millimeter wave radio frequency spectrum in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may receive an uplink grant from a base station that indicates uplink resources for transmission of uplink data from the UE to the base station in a shared mmW radio frequency spectrum band, perform, responsive to receiving the uplink grant, an LBT procedure to determine that the shared mmW radio frequency spectrum band is available for the uplink transmission, and transmit, based on the shared mmW radio frequency spectrum band being available for the uplink transmission, the uplink data to the base station using the uplink resources indicated in the uplink grant.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include random-access memory (RAM) or read-only memory (ROM). The memory 1330 may store computer-readable, computer-executable code 1335 including instructions that, when executed, cause the processor to perform various functions described herein. In some cases, the memory 1330 may contain, among other things, a basic input/output system (BIOS) which may control basic hardware or software operation such as the interaction with peripheral components or devices.

The processor 1340 may include an intelligent hardware device, (e.g., a general-purpose processor, a DSP, a central processing unit (CPU), a microcontroller, an ASIC, an FPGA, a PLD, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting listen before talk techniques in shared millimeter wave radio frequency spectrum).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
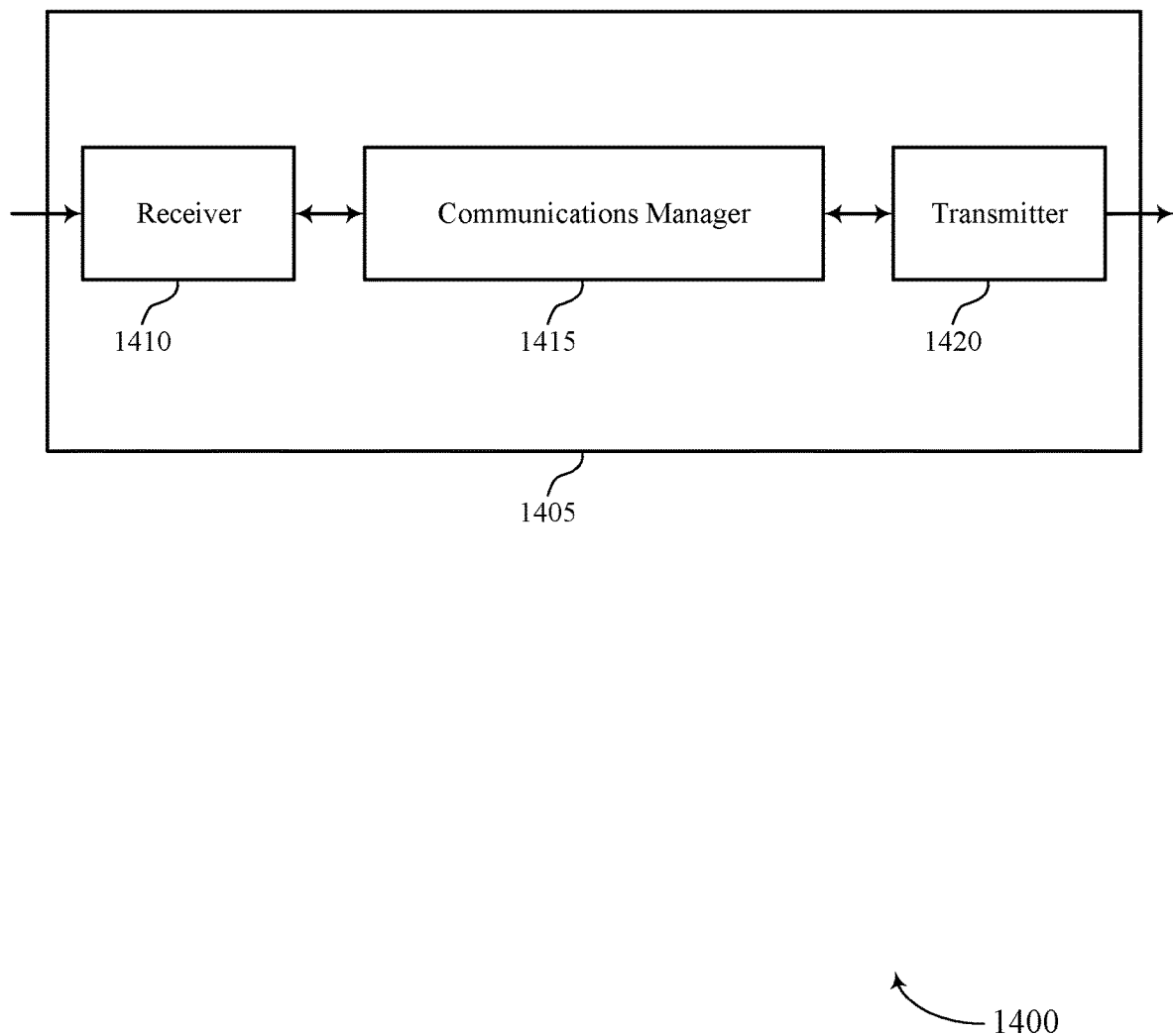
FIGS. 14 and 15 show block diagrams of devices that support listen before talk techniques in shared millimeter wave radio frequency spectrum in accordance with aspects of the present disclosure.

FIG. 14 shows a block diagram 1400 of a device 1405 that supports listen before talk techniques in shared millimeter wave radio frequency spectrum in accordance with aspects of the present disclosure. The device 1405 may be an example of aspects of a base station 105 as described herein. The device 1405 may include a receiver 1410, a communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to listen before talk techniques in shared millimeter wave radio frequency spectrum, etc.). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may allocate uplink resources to a UE for an uplink transmission of uplink data from the UE to the base station in a shared mmW radio frequency spectrum band, transmit an uplink grant to the UE indicating the uplink resources, and monitor for the uplink transmission from the UE using the uplink resources indicated in the uplink grant, where the UE is to perform an LBT procedure prior to the uplink transmission. The communications manager 1415 may be an example of aspects of the communications manager 1710 described herein.

The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a DSP, an ASIC, an FPGA or other PLD, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
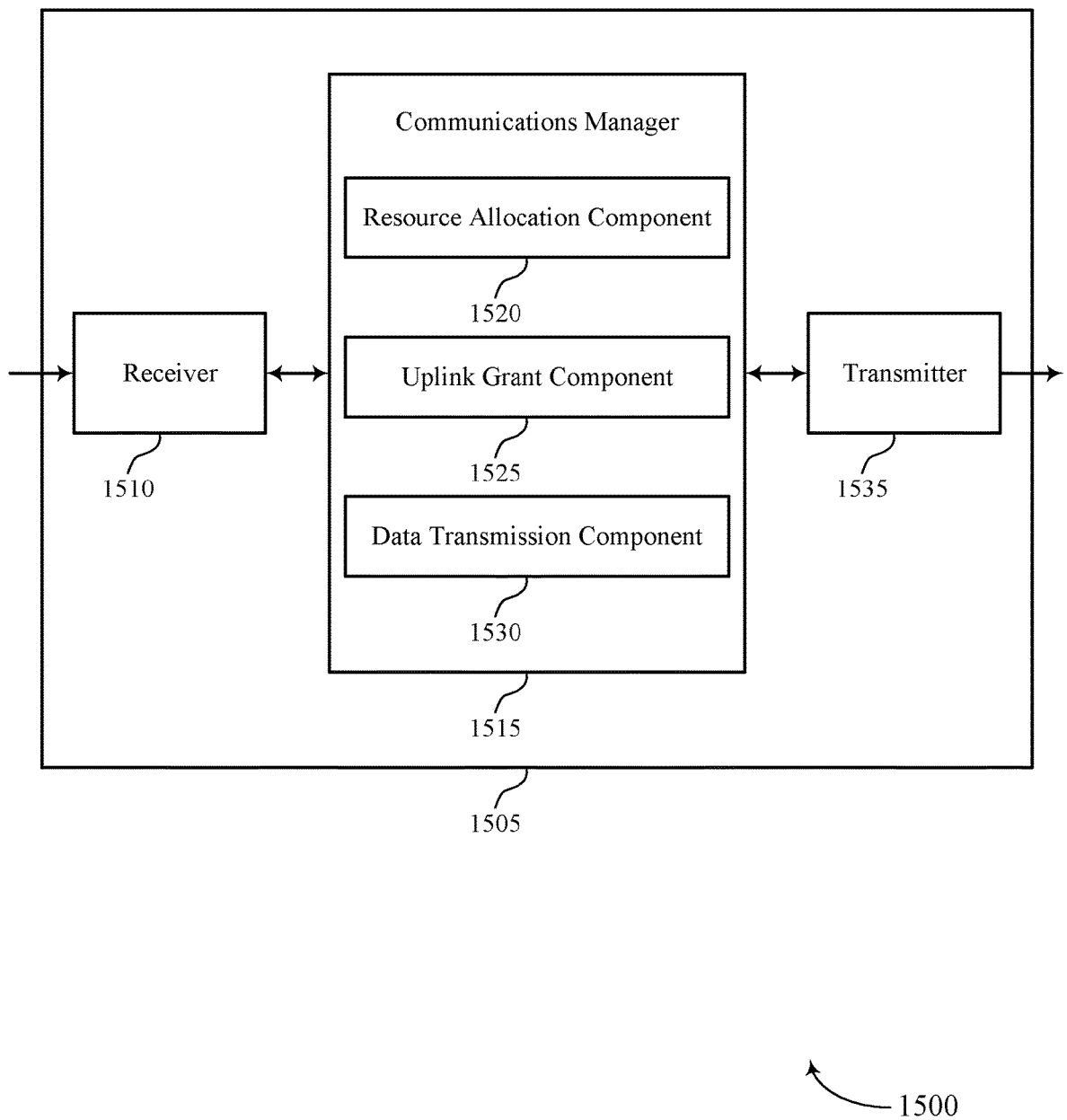

FIG. 15 shows a block diagram 1500 of a device 1505 that supports listen before talk techniques in shared millimeter wave radio frequency spectrum in accordance with aspects of the present disclosure. The device 1505 may be an example of aspects of a device 1405 or a base station 105 as described herein. The device 1505 may include a receiver 1510, a communications manager 1515, and a transmitter 1535. The device 1505 may also include a processor. Each of these components may be in communication with one another (e.g., via one or more buses).

The receiver 1510 may receive information such as packets, user data, or control information associated with various information channels (e.g., control channels, data channels, and information related to listen before talk techniques in shared millimeter wave radio frequency spectrum, etc.). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a resource allocation component 1520, an uplink grant component 1525, and a data transmission component 1530. The communications manager 1515 may be an example of aspects of the communications manager 1710 described herein.

The resource allocation component 1520 may allocate uplink resources to a UE for an uplink transmission of uplink data from the UE to the base station in a shared mmW radio frequency spectrum band.

The uplink grant component 1525 may transmit an uplink grant to the UE indicating the uplink resources, where the UE is to perform an LBT procedure prior to the uplink transmission.

The data transmission component 1530 may monitor for the uplink transmission from the UE using the uplink resources indicated in the uplink grant.

The transmitter 1535 may transmit signals generated by other components of the device 1505. In some examples, the transmitter 1535 may be collocated with a receiver 1510 in a transceiver module. For example, the transmitter 1535 may be an example of aspects of the transceiver 1720 described with reference to FIG. 17. The transmitter 1535 may utilize a single antenna or a set of antennas.

Figure 16:
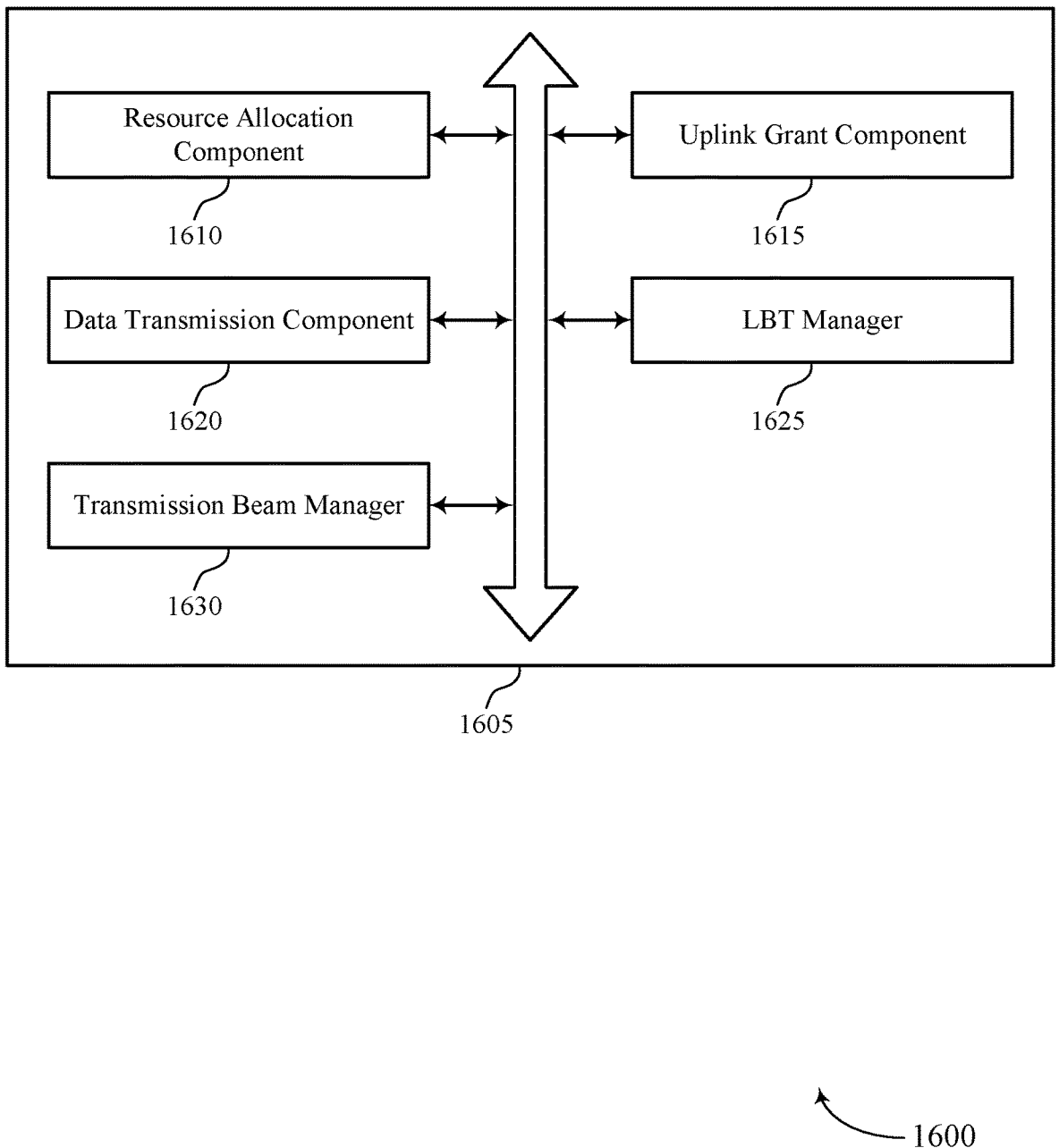
FIG. 16 shows a block diagram of a communications manager that supports listen before talk techniques in shared millimeter wave radio frequency spectrum in accordance with aspects of the present disclosure.

FIG. 16 shows a block diagram 1600 of a communications manager 1605 that supports listen before talk techniques in shared millimeter wave radio frequency spectrum in accordance with aspects of the present disclosure. The communications manager 1605 may be an example of aspects of a communications manager 1415, a communications manager 1515, or a communications manager 1710 described herein. The communications manager 1605 may include a resource allocation component 1610, an uplink grant component 1615, a data transmission component 1620, an LBT manager 1625, and a transmission beam manager 1630. Each of these modules may communicate, directly or indirectly, with one another (e.g., via one or more buses).

The resource allocation component 1610 may allocate uplink resources to a UE for an uplink transmission of uplink data from the UE to the base station in a shared mmW radio frequency spectrum band. In some examples, the resource allocation component 1610 may determine that a second uplink transmission of a second UE has a second duration that is less than the duration of the LBT procedure of the first UE. In some examples, the resource allocation component 1610 may schedule the second uplink transmission of the second UE within the duration of the LBT procedure of the first UE. In some examples, the resource allocation component 1610, following a CCA failure, may reuse the granted resource for transmission or reception for one or more different UEs.

The uplink grant component 1615 may transmit an uplink grant to the UE indicating the uplink resources, where the UE is to perform an LBT procedure prior to the uplink transmission. In some examples, the uplink grant component 1615 may transmit a second uplink grant to the second UE. In some examples, the uplink grant component 1615 may determine an offset value between the uplink grant and a start of the LBT procedure at the first UE based on a duration of the second uplink transmission of the second UE. In some examples, the uplink grant component 1615 may indicate the offset value to the first UE. In some examples, the uplink grant component 1615 may transmit a second uplink grant to a different UE during a duration of the LBT procedure.

In some cases, the uplink grant is transmitted to the UE during a downlink transmission of a previous COT or TxOP. In some cases, the uplink grant further indicates an ending time of the previous COT or TxOP, and where the UE initiates the LBT procedure after the ending time of the previous COT or TxOP. In some cases, the uplink grant is transmitted from the base station before an end of the downlink transmission of downlink shared channel data.

The data transmission component 1620 may monitor for the uplink transmission from the UE using the uplink resources indicated in the uplink grant. In some examples, the data transmission component 1620 may determine that the uplink transmission is not received, and that the granted resources may be reused.

The LBT manager 1625 may transmit, to the UE, an indication of a duration of the LBT procedure. In some examples, the LBT manager 1625 may randomly select the random number for the CCA procedure. In some examples, the LBT manager 1625 may provide the random number to the UE as the indication of the duration of the LBT procedure. In some cases, the indication of the duration of the LBT procedure is included in the uplink grant or transmitted together with the uplink grant. In some cases, the duration of the LBT procedure is synchronized with a frame boundary, a slot boundary, or a symbol boundary of a frame structure used for communications between the UE and the base station.

In some cases, the uplink grant is a short control signaling transmission that is exempt from the LBT procedure. In some cases, at least a portion of a duration of the LBT procedure overlaps with a portion of the previous COT or TxOP.

The transmission beam manager 1630 may manage one or more transmission beams in for a mmW channel. In some cases, the second UE is selected based on a cross-UE interference between transmission beams of the first UE and the second UE being below a threshold value. In some cases, one or more of the uplink grant or uplink transmission are transmitted via a beamformed transmission beam.

Figure 17:
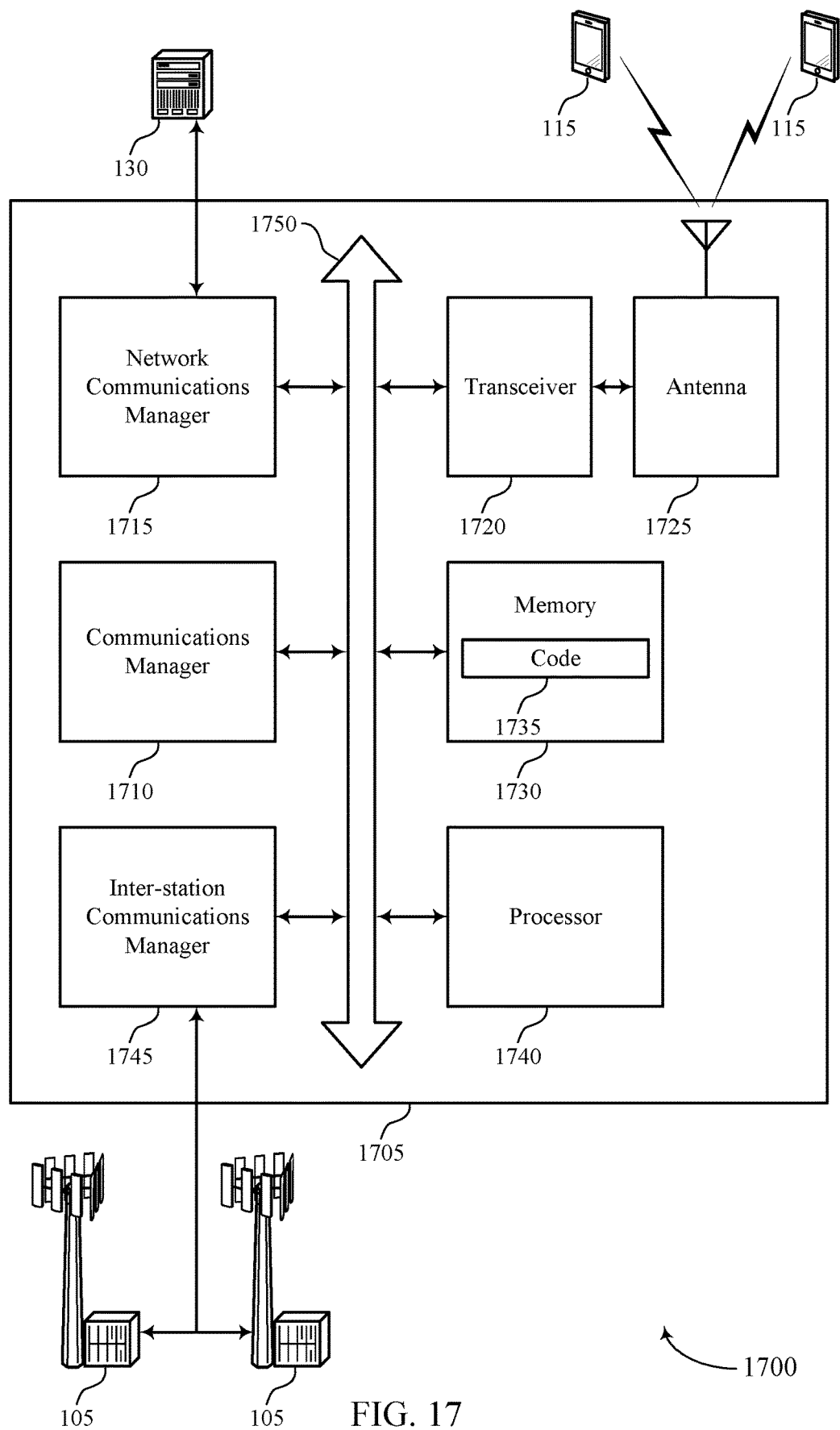
FIG. 17 shows a diagram of a system including a device that supports listen before talk techniques in shared millimeter wave radio frequency spectrum in accordance with aspects of the present disclosure.

FIG. 17 shows a diagram of a system 1700 including a device 1705 that supports listen before talk techniques in shared millimeter wave radio frequency spectrum in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a communications manager 1710, a network communications manager 1715, a transceiver 1720, an antenna 1725, memory 1730, a processor 1740, and an inter-station communications manager 1745. These components may be in electronic communication via one or more buses (e.g., bus 1750).

The communications manager 1710 may allocate uplink resources to a UE for an uplink transmission of uplink data from the UE to the base station in a shared mmW radio frequency spectrum band, transmit an uplink grant to the UE indicating the uplink resources, and monitor for the uplink transmission from the UE using the uplink resources indicated in the uplink grant, where the UE is to perform an LBT procedure prior to the uplink transmission.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by a processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device to perform various functions (e.g., functions or tasks supporting listen before talk techniques in shared millimeter wave radio frequency spectrum).

The inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
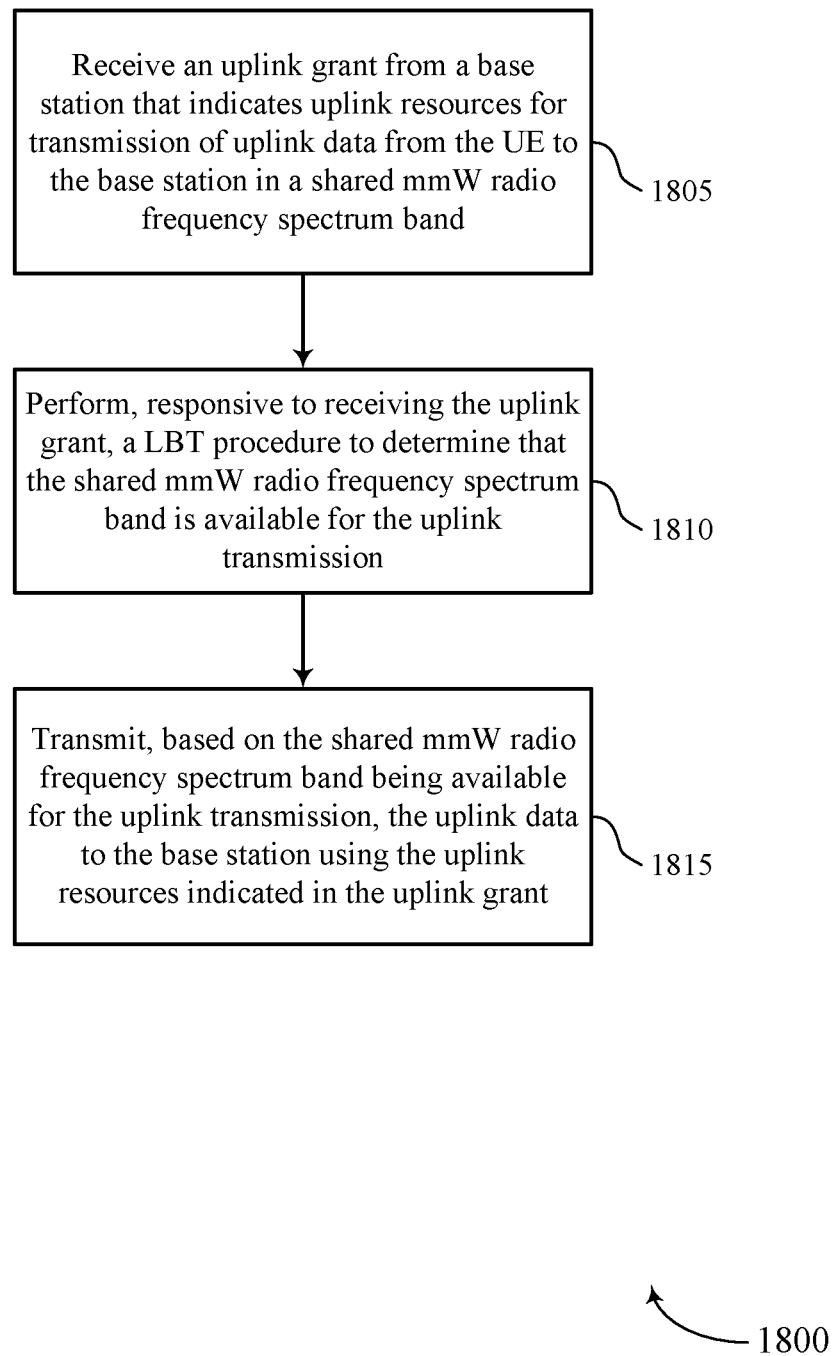
FIGS. 18 through 24 show flowcharts illustrating methods that support listen before talk techniques in shared millimeter wave radio frequency spectrum in accordance with aspects of the present disclosure.

FIG. 18 shows a flowchart illustrating a method 1800 that supports listen before talk techniques in shared millimeter wave radio frequency spectrum in accordance with aspects of the present disclosure. The operations of method 1800 may be implemented by a UE 115 or its components as described herein. For example, the operations of method 1800 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1805, the UE may receive an uplink grant from a base station that indicates uplink resources for transmission of uplink data from the UE to the base station in a shared mmW radio frequency spectrum band. The operations of 1805 may be performed according to the methods described herein. In some examples, aspects of the operations of 1805 may be performed by a resource allocation component as described with reference to FIGS. 10 through 13.

At 1810, the UE may perform, responsive to receiving the uplink grant, an LBT procedure to determine that the shared mmW radio frequency spectrum band is available for the uplink transmission. The operations of 1810 may be performed according to the methods described herein. In some examples, aspects of the operations of 1810 may be performed by an LBT manager as described with reference to FIGS. 10 through 13.

At 1815, the UE may transmit, based on the shared mmW radio frequency spectrum band being available for the uplink transmission, the uplink data to the base station using the uplink resources indicated in the uplink grant. The operations of 1815 may be performed according to the methods described herein. In some examples, aspects of the operations of 1815 may be performed by a data transmission component as described with reference to FIGS. 10 through 13.

Figure 19:
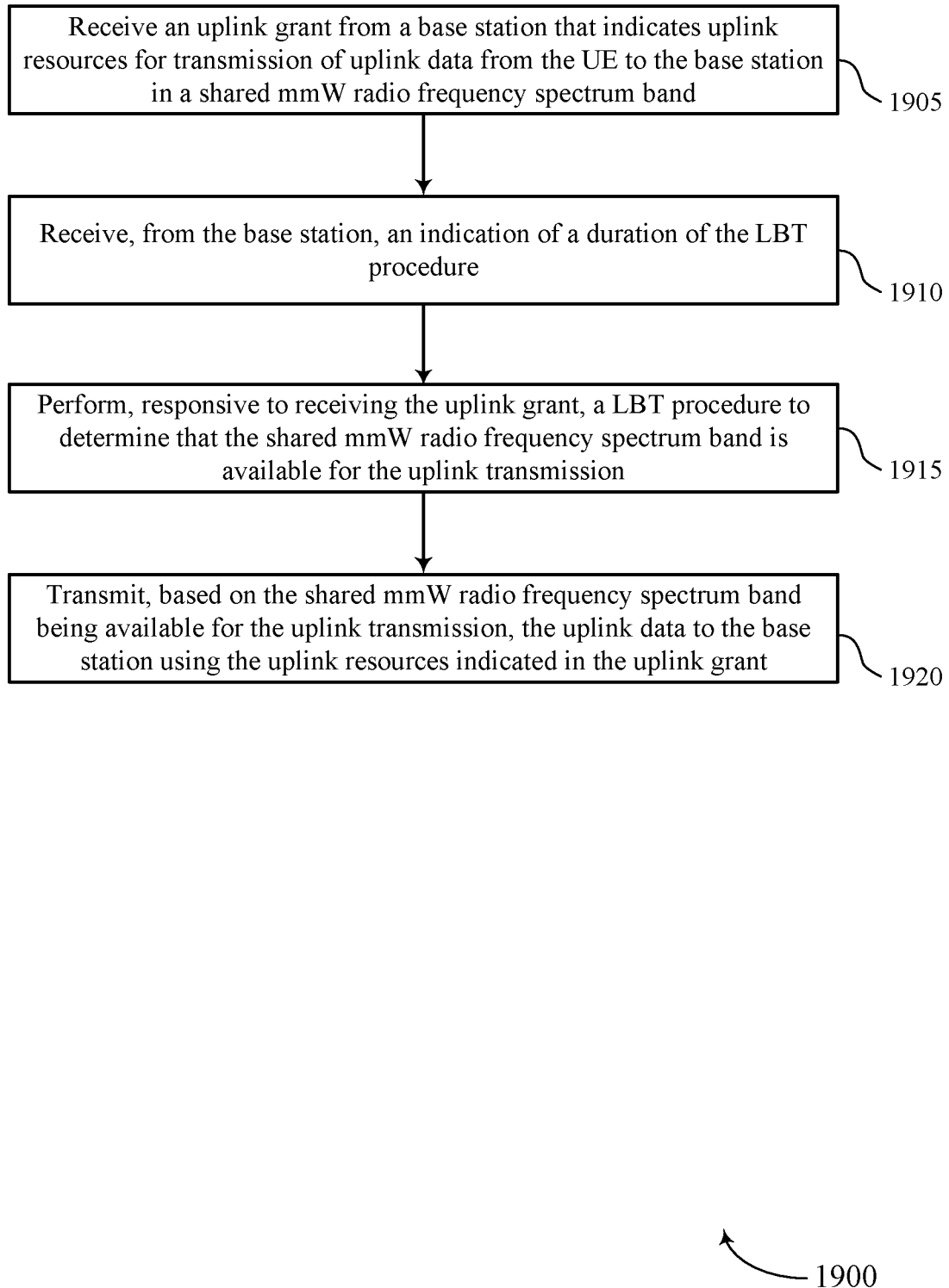

FIG. 19 shows a flowchart illustrating a method 1900 that supports listen before talk techniques in shared millimeter wave radio frequency spectrum in accordance with aspects of the present disclosure. The operations of method 1900 may be implemented by a UE 115 or its components as described herein. For example, the operations of method 1900 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1905, the UE may receive an uplink grant from a base station that indicates uplink resources for transmission of uplink data from the UE to the base station in a shared mmW radio frequency spectrum band. The operations of 1905 may be performed according to the methods described herein. In some examples, aspects of the operations of 1905 may be performed by a resource allocation component as described with reference to FIGS. 10 through 13.

At 1910, the UE may receive, from the base station, an indication of a duration of the LBT procedure. The operations of 1910 may be performed according to the methods described herein. In some examples, aspects of the operations of 1910 may be performed by an LBT manager as described with reference to FIGS. 10 through 13. In some cases, the LBT procedure is a CCA check using ED for a duration of a CCA observation time, where the CCA observation time is based in part on a random number that is selected for a number of CCA slots to measure channel energy, and where the receiving the indication of the duration of the LBT procedure includes receiving the random number from the base station. In some cases, the indication of the duration of the LBT procedure is included in the uplink grant or transmitted together with the uplink grant. In some cases, the duration of the LBT procedure is synchronized with a frame boundary, a slot boundary, or a symbol boundary of a frame structure used for communications between the UE and the base station. In some cases, the indication of the duration of the LBT procedure further indicates an offset value, and where the LBT procedure is initiated after a time period associated with the offset value.

At 1915, the UE may perform, responsive to receiving the uplink grant, an LBT procedure to determine that the shared mmW radio frequency spectrum band is available for the uplink transmission. The operations of 1915 may be performed according to the methods described herein. In some examples, aspects of the operations of 1915 may be performed by an LBT manager as described with reference to FIGS. 10 through 13.

At 1920, the UE may transmit, based on the shared mmW radio frequency spectrum band being available for the uplink transmission, the uplink data to the base station using the uplink resources indicated in the uplink grant. The operations of 1920 may be performed according to the methods described herein. In some examples, aspects of the operations of 1920 may be performed by a data transmission component as described with reference to FIGS. 10 through 13.

Figure 20:
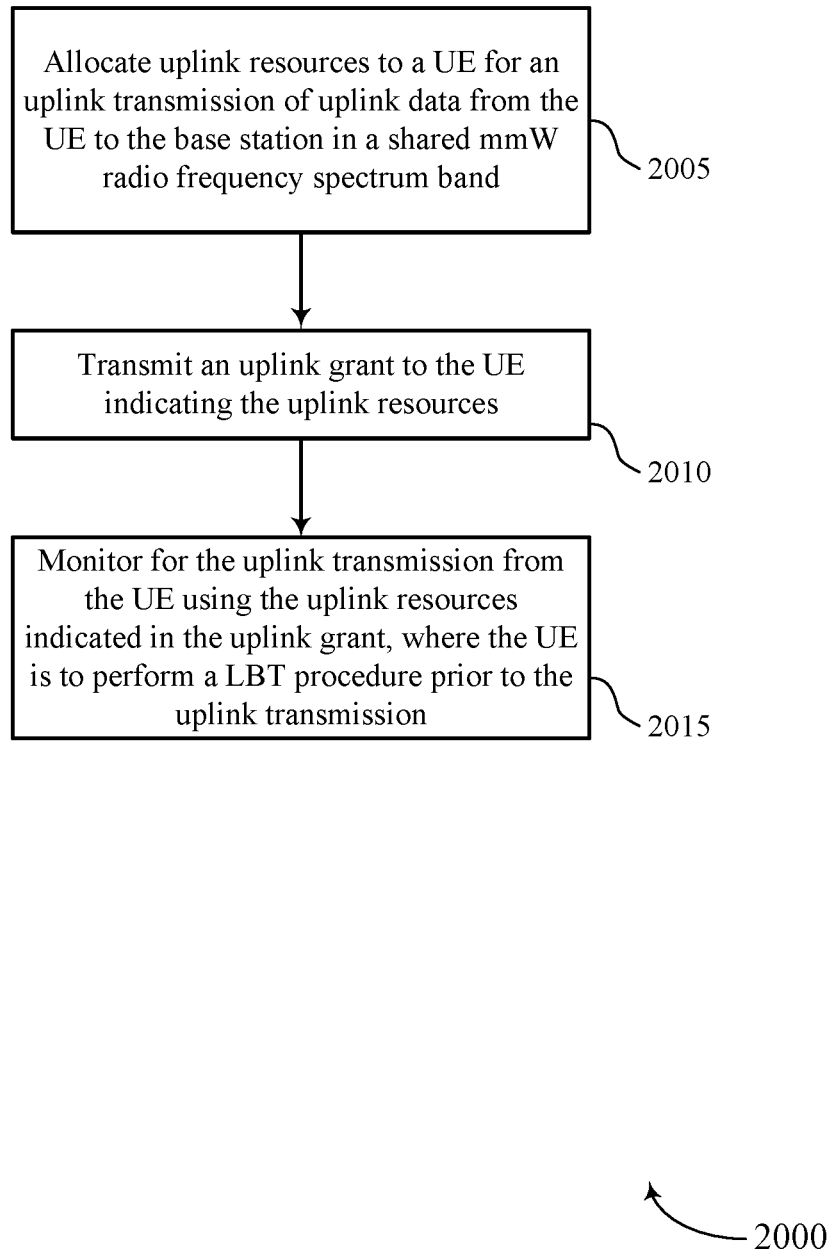

FIG. 20 shows a flowchart illustrating a method 2000 that supports listen before talk techniques in shared millimeter wave radio frequency spectrum in accordance with aspects of the present disclosure. The operations of method 2000 may be implemented by a base station 105 or its components as described herein. For example, the operations of method 2000 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2005, the base station may allocate uplink resources to a UE for an uplink transmission of uplink data from the UE to the base station in a shared mmW radio frequency spectrum band. The operations of 2005 may be performed according to the methods described herein. In some examples, aspects of the operations of 2005 may be performed by a resource allocation component as described with reference to FIGS. 14 through 17.

At 2010, the base station may transmit an uplink grant to the UE indicating the uplink resources. The operations of 2010 may be performed according to the methods described herein. In some examples, aspects of the operations of 2010 may be performed by an uplink grant component as described with reference to FIGS. 14 through 17.

At 2015, the base station may monitor for the uplink transmission from the UE using the uplink resources indicated in the uplink grant, where the UE is to perform an LBT procedure prior to the uplink transmission. The operations of 2015 may be performed according to the methods described herein. In some examples, aspects of the operations of 2015 may be performed by a data transmission component as described with reference to FIGS. 14 through 17.

Figure 21:
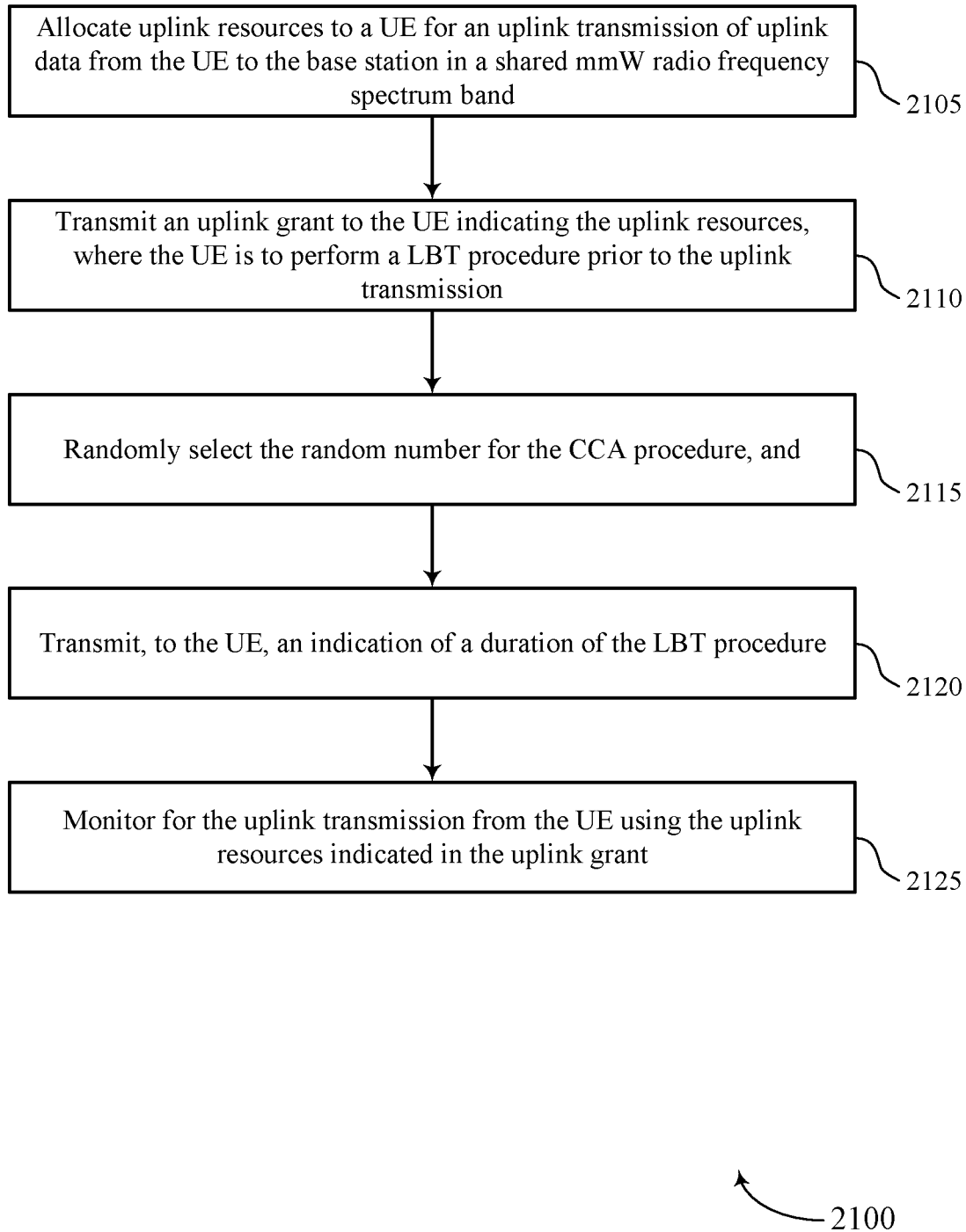

FIG. 21 shows a flowchart illustrating a method 2100 that supports listen before talk techniques in shared millimeter wave radio frequency spectrum in accordance with aspects of the present disclosure. The operations of method 2100 may be implemented by a base station 105 or its components as described herein. For example, the operations of method 2100 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2105, the base station may allocate uplink resources to a UE for an uplink transmission of uplink data from the UE to the base station in a shared mmW radio frequency spectrum band. The operations of 2105 may be performed according to the methods described herein. In some examples, aspects of the operations of 2105 may be performed by a resource allocation component as described with reference to FIGS. 14 through 17.

At 2110, the base station may transmit an uplink grant to the UE indicating the uplink resources, where the UE is to perform an LBT procedure prior to the uplink transmission. The operations of 2110 may be performed according to the methods described herein. In some examples, aspects of the operations of 2110 may be performed by an uplink grant component as described with reference to FIGS. 14 through 17.

At 2115, the base station may randomly select the random number for the CCA procedure. The operations of 2115 may be performed according to the methods described herein. In some examples, aspects of the operations of 2115 may be performed by an LBT manager as described with reference to FIGS. 14 through 17. In some cases, the base station may provide the random number to the UE as the indication of the duration of the LBT procedure. In some cases, the indication of the duration of the LBT procedure is included in the uplink grant or transmitted together with the uplink grant.

At 2120, the base station may transmit, to the UE, an indication of a duration of the LBT procedure. The operations of 2120 may be performed according to the methods described herein. In some examples, aspects of the operations of 2120 may be performed by an LBT manager as described with reference to FIGS. 14 through 17. In some cases, the duration of the LBT procedure is synchronized with a frame boundary, a slot boundary, or a symbol boundary of a frame structure used for communications between the UE and the base station.

At 2125, the base station may monitor for the uplink transmission from the UE using the uplink resources indicated in the uplink grant. The operations of 2125 may be performed according to the methods described herein. In some examples, aspects of the operations of 2125 may be performed by a data transmission component as described with reference to FIGS. 14 through 17.

Figure 22:
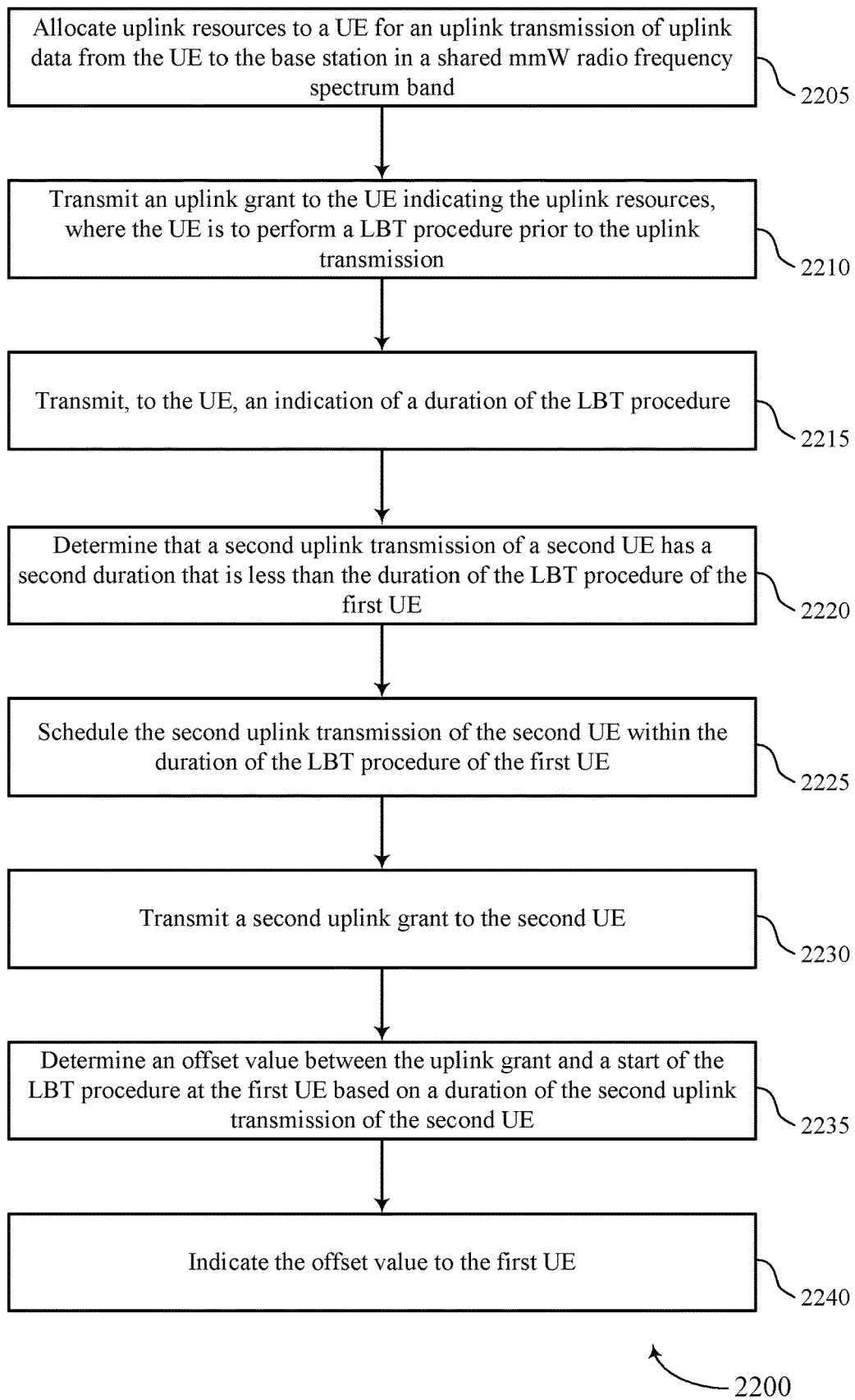

FIG. 22 shows a flowchart illustrating a method 2200 that supports listen before talk techniques in shared millimeter wave radio frequency spectrum in accordance with aspects of the present disclosure. The operations of method 2200 may be implemented by a base station 105 or its components as described herein. For example, the operations of method 2200 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2205, the base station may allocate uplink resources to a UE for an uplink transmission of uplink data from the UE to the base station in a shared mmW radio frequency spectrum band. The operations of 2205 may be performed according to the methods described herein. In some examples, aspects of the operations of 2205 may be performed by a resource allocation component as described with reference to FIGS. 14 through 17.

At 2210, the base station may transmit an uplink grant to the UE indicating the uplink resources, where the UE is to perform an LBT procedure prior to the uplink transmission. The operations of 2210 may be performed according to the methods described herein. In some examples, aspects of the operations of 2210 may be performed by an uplink grant component as described with reference to FIGS. 14 through 17.

At 2215, the base station may transmit, to the UE, an indication of a duration of the LBT procedure. The operations of 2215 may be performed according to the methods described herein. In some examples, aspects of the operations of 2215 may be performed by an LBT manager as described with reference to FIGS. 14 through 17.

At 2220, the base station may determine that a second uplink transmission of a second UE has a second duration that is less than the duration of the LBT procedure of the first UE. The operations of 2220 may be performed according to the methods described herein. In some examples, aspects of the operations of 2220 may be performed by a resource allocation component as described with reference to FIGS. 14 through 17.

At 2225, the base station may schedule the second uplink transmission of the second UE within the duration of the LBT procedure of the first UE. The operations of 2225 may be performed according to the methods described herein. In some examples, aspects of the operations of 2225 may be performed by a resource allocation component as described with reference to FIGS. 14 through 17.

At 2230, the base station may transmit a second uplink grant to the second UE. The operations of 2230 may be performed according to the methods described herein. In some examples, aspects of the operations of 2230 may be performed by an uplink grant component as described with reference to FIGS. 14 through 17.

At 2235, the base station may determine an offset value between the uplink grant and a start of the LBT procedure at the first UE based on a duration of the second uplink transmission of the second UE. The operations of 2235 may be performed according to the methods described herein. In some examples, aspects of the operations of 2235 may be performed by an uplink grant component as described with reference to FIGS. 14 through 17.

At 2240, the base station may indicate the offset value to the first UE. The operations of 2240 may be performed according to the methods described herein. In some examples, aspects of the operations of 2240 may be performed by an uplink grant component as described with reference to FIGS. 14 through 17. In some cases, the second UE is selected based on a cross-UE interference between transmission beams of the first UE and the second UE being below a threshold value.

Figure 23:
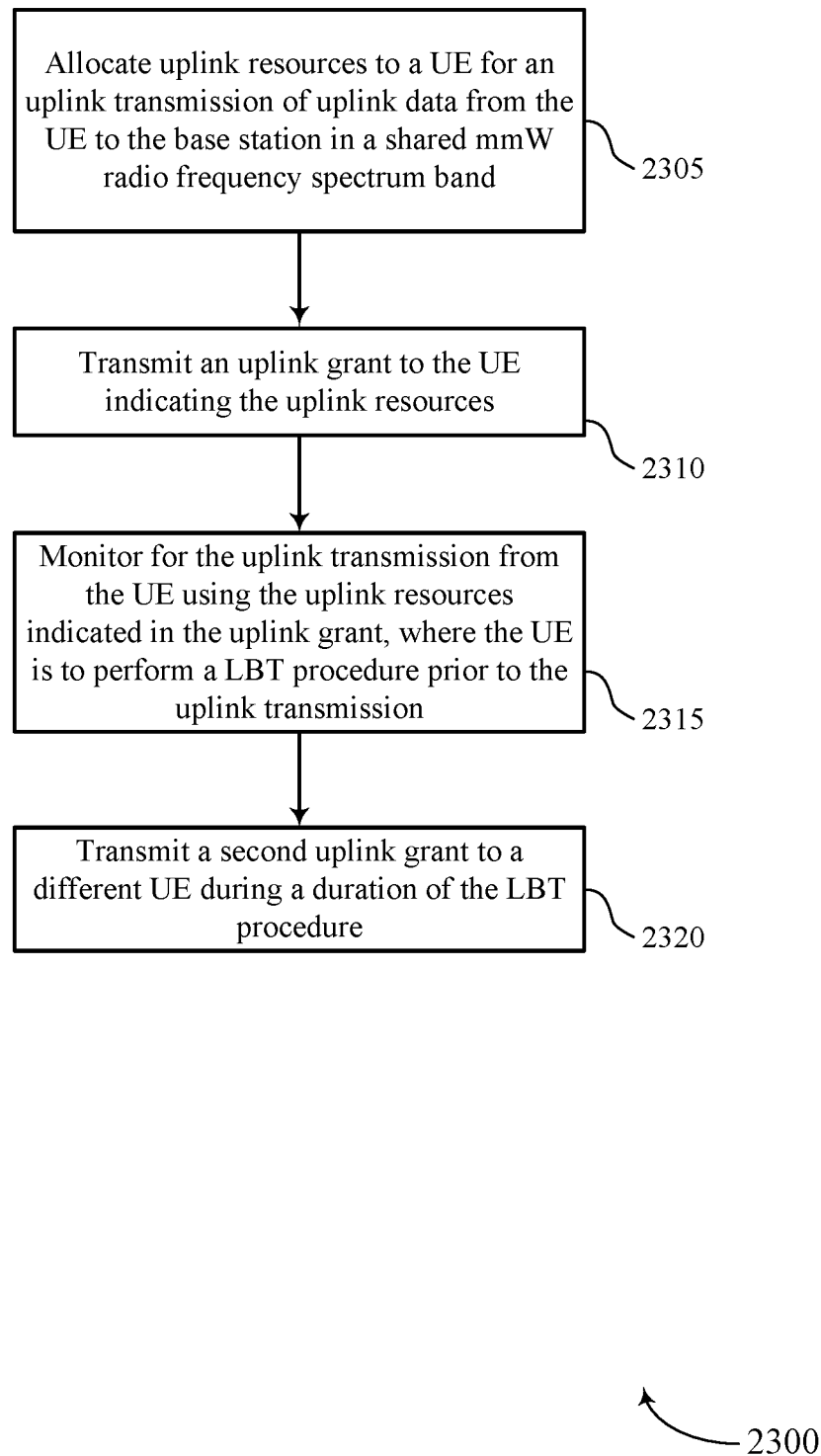

FIG. 23 shows a flowchart illustrating a method 2300 that supports listen before talk techniques in shared millimeter wave radio frequency spectrum in accordance with aspects of the present disclosure. The operations of method 2300 may be implemented by a base station 105 or its components as described herein. For example, the operations of method 2300 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2305, the base station may allocate uplink resources to a UE for an uplink transmission of uplink data from the UE to the base station in a shared mmW radio frequency spectrum band. The operations of 2305 may be performed according to the methods described herein. In some examples, aspects of the operations of 2305 may be performed by a resource allocation component as described with reference to FIGS. 14 through 17.

At 2310, the base station may transmit an uplink grant to the UE indicating the uplink resources. The operations of 2310 may be performed according to the methods described herein. In some examples, aspects of the operations of 2310 may be performed by an uplink grant component as described with reference to FIGS. 14 through 17.

At 2315, the base station may monitor for the uplink transmission from the UE using the uplink resources indicated in the uplink grant, where the UE is to perform an LBT procedure prior to the uplink transmission. The operations of 2315 may be performed according to the methods described herein. In some examples, aspects of the operations of 2315 may be performed by a data transmission component as described with reference to FIGS. 14 through 17.

At 2320, the base station may transmit a second uplink grant to a different UE during a duration of the LBT procedure. The operations of 2320 may be performed according to the methods described herein. In some examples, aspects of the operations of 2320 may be performed by an uplink grant component as described with reference to FIGS. 14 through 17. In some cases, the uplink grants are short control signaling transmission that are exempt from the LBT procedure.

Figure 24:
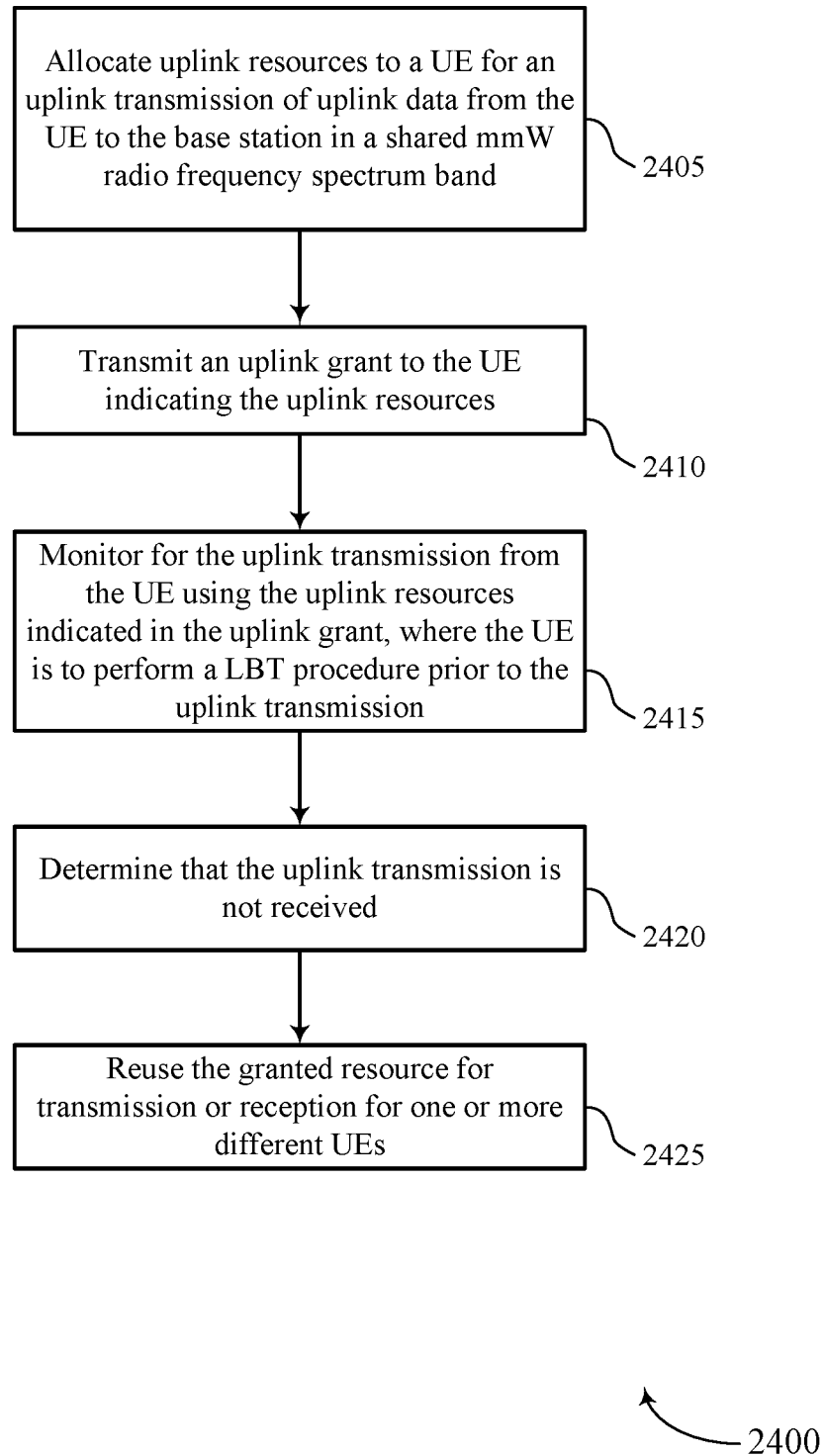

FIG. 24 shows a flowchart illustrating a method 2400 that supports listen before talk techniques in shared millimeter wave radio frequency spectrum in accordance with aspects of the present disclosure. The operations of method 2400 may be implemented by a base station 105 or its components as described herein. For example, the operations of method 2400 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2405, the base station may allocate uplink resources to a UE for an uplink transmission of uplink data from the UE to the base station in a shared mmW radio frequency spectrum band. The operations of 2405 may be performed according to the methods described herein. In some examples, aspects of the operations of 2405 may be performed by a resource allocation component as described with reference to FIGS. 14 through 17.

At 2410, the base station may transmit an uplink grant to the UE indicating the uplink resources. The operations of 2410 may be performed according to the methods described herein. In some examples, aspects of the operations of 2410 may be performed by an uplink grant component as described with reference to FIGS. 14 through 17.

At 2415, the base station may monitor for the uplink transmission from the UE using the uplink resources indicated in the uplink grant, where the UE is to perform an LBT procedure prior to the uplink transmission. The operations of 2415 may be performed according to the methods described herein. In some examples, aspects of the operations of 2415 may be performed by a data transmission component as described with reference to FIGS. 14 through 17.

At 2420, the base station may determine that the uplink transmission is not received. The operations of 2420 may be performed according to the methods described herein. In some examples, aspects of the operations of 2420 may be performed by a data transmission component as described with reference to FIGS. 14 through 17.

At 2425, the base station may reuse the granted resource for transmission or reception for one or more different UEs. The operations of 2425 may be performed according to the methods described herein. In some examples, aspects of the operations of 2425 may be performed by a resource allocation component as described with reference to FIGS. 14 through 17.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:

receiving an uplink grant from a base station that indicates uplink resources for transmission of uplink data from the UE to the base station in a shared millimeter wave (mmW) radio frequency spectrum band;

determining a duration of a listen-before-talk (LBT) procedure, wherein the duration of the LBT procedure is synchronized with a frame boundary, a slot boundary, or a symbol boundary of a frame structure used for communications between the UE and the base station;

performing, responsive to receiving the uplink grant, the LBT procedure to determine that the shared mmW radio frequency spectrum band is available for the transmission of the uplink data, wherein the LBT procedure is a clear channel assessment (CCA) check using energy detection (ED) for a duration of a CCA observation time based in part on a random number that is selected for a number of CCA slots to measure channel energy; and transmitting, based at least in part on the shared mmW radio frequency spectrum band being available for the transmission of the uplink data, the uplink data to the base station using the uplink resources indicated in the uplink grant.

2. The method of claim 1, further comprising:
receiving, from the base station, an indication of the duration of the LBT procedure.

3. The method of claim 2, wherein the receiving the indication of the duration of the LBT procedure comprises receiving the random number from the base station.

4. The method of claim 2, wherein the indication of the duration of the LBT procedure is included in the uplink grant or transmitted together with the uplink grant.

5. The method of claim 2, wherein the indication of the duration of the LBT procedure further indicates an offset value, and wherein the LBT procedure is initiated after a time period associated with the offset value.

6. The method of claim 1, wherein the uplink grant is a short control signaling transmission that is exempt from the LBT procedure.

7. The method of claim 1, further comprising:
abandoning the transmitting of the uplink data based at least in part on the shared mmW radio frequency spectrum band being unavailable for the transmission of the uplink data.

8. The method of claim 1, wherein the uplink grant is received from the base station during a downlink transmission from the base station in a previous channel occupancy time (COT) or transmission opportunity (TxOP).

9. The method of claim 8, wherein the uplink grant further indicates an ending time of the previous COT or TxOP, and wherein the UE initiates the LBT procedure after the ending time of the previous COT or TxOP.

10. The method of claim 8, wherein at least a portion of the duration of the LBT procedure overlaps with a portion of the previous COT or TxOP.

11. The method of claim 10, wherein the previous COT or TxOP includes a transmission for a different UE.

12. The method of claim 1, wherein one or more of the uplink grant or transmission of the uplink data are transmitted via a beamformed transmission beam.

13. A method for wireless communication at a base station, comprising:
allocating uplink resources to a user equipment (UE) for an uplink transmission of uplink data from the UE to the base station in a shared millimeter wave (mmW) radio frequency spectrum band;

transmitting an uplink grant to the UE indicating the uplink resources;

determining a duration of a listen-before-talk (LBT) procedure, wherein the duration of the LBT procedure is synchronized with a frame boundary, a slot boundary, or a symbol boundary of a frame structure used for communications between the UE and the base station; and monitoring for the uplink transmission from the UE using the uplink resources indicated in the uplink grant, wherein the UE is to perform the LBT procedure prior to the uplink transmission, and wherein the LBT procedure is a clear channel assessment (CCA) check using energy detection (ED) for a duration of a CCA observation time based in part on a random number that is selected for a number of CCA slots to measure channel energy.

14. The method of claim 13, further comprising:
transmitting, to the UE, an indication of the duration of the LBT procedure.

15. The method of claim 14, wherein the method further comprises:
randomly selecting the random number for the CCA, and providing the random number to the UE as the indication of the duration of the LBT procedure.

16. The method of claim 14, wherein the indication of the duration of the LBT procedure is included in the uplink grant or transmitted together with the uplink grant.

17. The method of claim 14, wherein the UE is a first UE, and wherein the method further comprises:
determining that a second uplink transmission of a second UE has a second duration that is less than the duration of the LBT procedure of the first UE;
scheduling the second uplink transmission of the second UE within the duration of the LBT procedure of the first UE; and
transmitting a second uplink grant to the second UE.

18. The method of claim 17, further comprising:
determining an offset value between the uplink grant and a start of the LBT procedure at the first UE based at least in part on a duration of the second uplink transmission of the second UE; and
indicating the offset value to the first UE.

19. The method of claim 17, wherein the second UE is selected based at least in part on a cross-UE interference between transmission beams of the first UE and the second UE being below a threshold value.

20. The method of claim 13, further comprising:
transmitting a second uplink grant to a different UE during the duration of the LBT procedure.

21. The method of claim 13, wherein the uplink grant is a short control signaling transmission that is exempt from the LBT procedure.

22. The method of claim 13, wherein the monitoring comprises:
determining that the uplink transmission is not received; and
reusing the granted resource for transmission or reception for one or more different UEs.

23. The method of claim 13, wherein the uplink grant is transmitted to the UE during a downlink transmission of a previous channel occupancy time (COT) or transmission opportunity (TxOP).

24. The method of claim 23, wherein the uplink grant further indicates an ending time of the previous COT or TxOP, and wherein the UE initiates the LBT procedure after the ending time of the previous COT or TxOP.

25. The method of claim 23, wherein at least a portion of the duration of the LBT procedure overlaps with a portion of the previous COT or TxOP.

26. The method of claim 23, wherein the uplink grant is transmitted from the base station before an end of the downlink transmission of downlink shared channel data.

27. The method of claim 13, wherein one or more of the uplink grant or uplink transmission are transmitted via a beamformed transmission beam.

28. An apparatus for wireless communication at a user equipment (UE), comprising:
a processor,
memory coupled with the processor; and
instructions stored in the memory and executable by the processor to cause the apparatus to:
receive an uplink grant from a base station that indicates uplink resources for transmission of uplink data from the UE to the base station in a shared millimeter wave (mmW) radio frequency spectrum band;
determine a duration of a listen-before-talk (LBT) procedure, wherein the duration of the LBT procedure is synchronized with a frame boundary, a slot boundary, or a symbol boundary of a frame structure used for communications between the UE and the base station;
perform, responsive to receiving the uplink grant, the LBT procedure to determine that the shared mmW radio frequency spectrum band is available for the transmission of the uplink data, wherein the LBT procedure is a clear channel assessment (CCA) check using energy detection (ED) for a duration of a CCA observation time based in part on a random number that is selected for a number of CCA slots to measure channel energy; and
transmit, based at least in part on the shared mmW radio frequency spectrum band being available for the transmission of the uplink data, the uplink data to the base station using the uplink resources indicated in the uplink grant.

29. The apparatus of claim 28, wherein the instructions are further executable by the processor to cause the apparatus to:
receive, from the base station, an indication of the duration of the LBT procedure.

30. The apparatus of claim 29, wherein the receiving the indication of the duration of the LBT procedure comprises receiving the random number from the base station.

31. The apparatus of claim 29, wherein the indication of the duration of the LBT procedure is included in the uplink grant or transmitted together with the uplink grant.

32. The apparatus of claim 29, wherein the indication of the duration of the LBT procedure further indicates an offset value, and wherein the LBT procedure is initiated after a time period associated with the offset value.

33. The apparatus of claim 28, wherein the uplink grant is a short control signaling transmission that is exempt from the LBT procedure.

34. The apparatus of claim 28, wherein the instructions are further executable by the processor to cause the apparatus to:
abandon the transmitting of the uplink data based at least in part on the shared mmW radio frequency spectrum band being unavailable for the transmission of the uplink data.

35. The apparatus of claim 28, wherein the uplink grant is received from the base station during a downlink transmission from the base station in a previous channel occupancy time (COT) or transmission opportunity (TxOP).

36. The apparatus of claim 35, wherein the uplink grant further indicates an ending time of the previous COT or TxOP, and wherein the UE initiates the LBT procedure after the ending time of the previous COT or TxOP.

37. The apparatus of claim 35, wherein at least a portion of the duration of the LBT procedure overlaps with a portion of the previous COT or TxOP.

38. The apparatus of claim 37, wherein the previous COT or TxOP includes a transmission for a different UE.

39. The apparatus of claim 28, wherein one or more of the uplink grant or transmission of the uplink data are transmitted via a beamformed transmission beam.

40. An apparatus for wireless communication at a base station, comprising:
a processor,
memory coupled with the processor; and
instructions stored in the memory and executable by the processor to cause the apparatus to:
allocate uplink resources to a user equipment (UE) for an uplink transmission of uplink data from the UE to the base station in a shared millimeter wave (mmW) radio frequency spectrum band;
transmit an uplink grant to the UE indicating the uplink resources;
determine a duration of a listen-before-talk (LBT) procedure, wherein the duration of the LBT procedure is synchronized with a frame boundary, a slot boundary, or a symbol boundary of a frame structure used for communications between the UE and the base station; and
monitor for the uplink transmission from the UE using the uplink resources indicated in the uplink grant, wherein the UE is to perform the LBT procedure prior to the uplink transmission, and wherein the LBT procedure is a clear channel assessment (CCA) check using energy detection (ED) for a duration of a CCA observation time based in part on a random number that is selected for a number of CCA slots to measure channel energy.

41. The apparatus of claim 40, wherein the instructions are further executable by the processor to cause the apparatus to:
transmit, to the UE, an indication of the duration of the LBT procedure.

42. The apparatus of claim 41, wherein the instructions are further executable by the processor to cause the apparatus to:
randomly select the random number for the CCA procedure; and
provide the random number to the UE as the indication of the duration of the LBT procedure.

43. The apparatus of claim 41, wherein the indication of the duration of the LBT procedure is included in the uplink grant or transmitted together with the uplink grant.

44. The apparatus of claim 41, wherein the UE is a first UE, and wherein the instructions are further executable by the processor to cause the apparatus to:
determine that a second uplink transmission of a second UE has a second duration that is less than the duration of the LBT procedure of the first UE;
schedule the second uplink transmission of the second UE within the duration of the LBT procedure of the first UE; and
transmit a second uplink grant to the second UE.

45. The apparatus of claim 44, wherein the instructions are further executable by the processor to cause the apparatus to:
  determine an offset value between the uplink grant and a start of the LBT procedure at the first UE based at least in part on a duration of the second uplink transmission of the second UE; and
  indicate the offset value to the first UE.

46. The apparatus of claim 44, wherein the second UE is selected based at least in part on a cross-UE interference between transmission beams of the first UE and the second UE being below a threshold value.

47. The apparatus of claim 40, wherein the instructions are further executable by the processor to cause the apparatus to:
  transmit a second uplink grant to a different UE during the duration of the LBT procedure.

48. The apparatus of claim 40, wherein the uplink grant is a short control signaling transmission that is exempt from the LBT procedure.

49. The apparatus of claim 40, wherein the instructions are further executable by the processor to cause the apparatus to:
  determine that the uplink transmission is not received; and
  reuse the granted resource for transmission or reception for one or more different UEs.

50. The apparatus of claim 40, wherein the uplink grant is transmitted to the UE during a downlink transmission of a previous channel occupancy time (COT) or transmission opportunity (TxOP).

51. The apparatus of claim 50, wherein the uplink grant further indicates an ending time of the previous COT or TxOP, and wherein the UE initiates the LBT procedure after the ending time of the previous COT or TxOP.

52. The apparatus of claim 50, wherein the uplink grant is transmitted from the base station before an end of the downlink transmission of downlink shared channel data.

53. The apparatus of claim 40, wherein at least a portion of the duration of the LBT procedure overlaps with a portion of the previous COT or TxOP.

54. The apparatus of claim 40, wherein one or more of the uplink grant or uplink transmission are transmitted via a beamformed transmission beam.

55. An apparatus for wireless communication at a user equipment (UE), comprising:
  means for receiving an uplink grant from a base station that indicates uplink resources for transmission of uplink data from the UE to the base station in a shared millimeter wave (mmW) radio frequency spectrum band;
  means for determining a duration of a listen-before-talk (LBT) procedure, wherein the duration of the LBT procedure is synchronized with a frame boundary, a slot boundary, or a symbol boundary of a frame structure used for communications between the UE and the base station;
  means for performing, responsive to receiving the uplink grant, the LBT procedure to determine that the shared mmW radio frequency spectrum band is available for the transmission of the uplink data, wherein the LBT procedure is a clear channel assessment (CCA) check using energy detection (ED) for a duration of a CCA observation time based in part on a random number that is selected for a number of CCA slots to measure channel energy; and
  means for transmitting, based at least in part on the shared mmW radio frequency spectrum band being available for the transmission of the uplink data, the uplink data to the base station using the uplink resources indicated in the uplink grant.

56. An apparatus for wireless communication at a base station, comprising:
  means for allocating uplink resources to a user equipment (UE) for an uplink transmission of uplink data from the UE to the base station in a shared millimeter wave (mmW) radio frequency spectrum band;
  means for transmitting an uplink grant to the UE indicating the uplink resources;
  means for determining a duration of a listen-before-talk (LBT) procedure, wherein the duration of the LBT procedure is synchronized with a frame boundary, a slot boundary, or a symbol boundary of a frame structure used for communications between the UE and the base station; and
  means for monitoring for the uplink transmission from the UE using the uplink resources indicated in the uplink grant, wherein the UE is to perform the LBT procedure prior to the uplink transmission, and wherein the LBT procedure is a clear channel assessment (CCA) check using energy detection (ED) for a duration of a CCA observation time based in part on a random number that is selected for a number of CCA slots to measure channel energy.

57. A non-transitory computer-readable medium storing code for wireless communication at a user equipment (UE), the code comprising instructions executable by a processor to:
  receive an uplink grant from a base station that indicates uplink resources for transmission of uplink data from the UE to the base station in a shared millimeter wave (mmW) radio frequency spectrum band;
  determine a duration of a listen-before-talk (LBT) procedure, wherein the duration of the LBT procedure is synchronized with a frame boundary, a slot boundary, or a symbol boundary of a frame structure used for communications between the UE and the base station;
  perform, responsive to receiving the uplink grant, the LBT procedure to determine that the shared mmW radio frequency spectrum band is available for the transmission of the uplink data, wherein the LBT procedure is a clear channel assessment (CCA) check using energy detection (ED) for a duration of a CCA observation time based in part on a random number that is selected for a number of CCA slots to measure channel energy; and
  transmit, based at least in part on the shared mmW radio frequency spectrum band being available for the transmission of the uplink data, the uplink data to the base station using the uplink resources indicated in the uplink grant.

58. A non-transitory computer-readable medium storing code for wireless communication at a base station, the code comprising instructions executable by a processor to:
  allocate uplink resources to a user equipment (UE) for an uplink transmission of uplink data from the UE to the base station in a shared millimeter wave (mmW) radio frequency spectrum band;
  transmit an uplink grant to the UE indicating the uplink resources;
  determine a duration of a listen-before-talk (LBT) procedure, wherein the duration of the LBT procedure is synchronized with a frame boundary, a slot boundary, or a symbol boundary of a frame structure used for communications between the UE and the base station; and monitor for the uplink transmission from the UE using the uplink resources indicated in the uplink grant, wherein the UE is to perform the LBT procedure prior to the uplink transmission, and wherein the LBT procedure is a clear channel assessment (CCA) check using energy detection (ED) for a duration of a CCA observation time based in part on a random number that is selected for a number of CCA slots to measure channel energy.

\* \* \* \* \*